US008467538B2

(12) United States Patent
Nakatani et al.

(10) Patent No.: US 8,467,538 B2
(45) Date of Patent: Jun. 18, 2013

(54) DEREVERBERATION APPARATUS, DEREVERBERATION METHOD, DEREVERBERATION PROGRAM, AND RECORDING MEDIUM

(75) Inventors: Tomohiro Nakatani, Kyoto (JP); Takuya Yoshioka, Kyoto (JP); Keisuke Kinoshita, Kyoto (JP); Masato Miyoshi, Kyoto (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 368 days.

(21) Appl. No.: 12/919,694

(22) PCT Filed: Feb. 27, 2009

(86) PCT No.: PCT/JP2009/054231

§ 371 (c)(1), (2), (4) Date: Sep. 2, 2010

(87) PCT Pub. No.: WO2009/110578

PCT Pub. Date: Sep. 11, 2009

(65) Prior Publication Data

US 2011/0002473 A1 Jan. 6, 2011

(30) Foreign Application Priority Data

Mar. 3, 2008 (JP) ................................ 2008-052175

(51) Int. Cl.
*H04B 3/20* (2006.01)

(52) U.S. Cl.
USPC ............ 381/66; 381/98; 381/94.3; 381/71.1; 704/E21.007; 379/406.14

(58) Field of Classification Search
USPC ............... 379/406.15, 406.16, 406.1, 406.11, 379/406.06, 406.12, 406.13, 406.14; 381/66, 381/63, 62, 71.1, 71.4, 94.7, 94.1, 94.3, 94.2, 98, 103; 704/E21.007, E19.014; 455/570, 455/114.2
See application file for complete search history.

(56) References Cited

U.S. PATENT DOCUMENTS

| | | | | |
|---|---|---|---|---|
| 5,774,562 | A | 6/1998 | Furuya et al. | |
| 2002/0059065 | A1 * | 5/2002 | Rajan | 704/226 |

FOREIGN PATENT DOCUMENTS

| | | |
|---|---|---|
| JP | 9 321860 | 12/1997 |
| JP | 2004 274234 | 9/2004 |
| JP | 2006 243676 | 9/2006 |

OTHER PUBLICATIONS

Tomohiro Nakatani, etc., "Importance of Energy and Spectral Features in Gaussian Source Model for Speech Dereverberation", IEEE Workshop on Applications of Signal Processing to Audio and Acoustics, Oct. 21-24, 2007, p. 299-302.*

(Continued)

*Primary Examiner* — Vivian Chin
*Assistant Examiner* — Leshui Zhang
(74) *Attorney, Agent, or Firm* — Oblon, Spivak, McClelland, Maier & Neustadt, L.L.P.

(57) ABSTRACT

A sound source model storage section stores a sound source model that represents an audio signal emitted from a sound source in the form of a probability density function. An observation signal, which is obtained by collecting the audio signal, is converted into a plurality of frequency-specific observation signals each corresponding to one of a plurality of frequency bands. Then, a dereverberation filter corresponding to each frequency band is estimated by using the frequency-specific observation signal for the frequency band on the basis of the sound source model and a reverberation model that represents a relationship for each frequency band among the audio signal, the observation signal and the dereverberation filter. A frequency-specific target signal corresponding to each frequency band is determined by applying the dereverberation filter for the frequency band to the frequency-specific observation signal for the frequency band, and the resulting frequency-specific target signals are integrated.

7 Claims, 10 Drawing Sheets

OTHER PUBLICATIONS

Tomohiro, Nakatani et al., "Study on Speech Dereverberation With Autocorrelation Codebook", Proceedings IEEE International Conference on Acoustics, Speech, and Signal Processing, (ICASSP-2007), vol. I, p. 193-196, (Apr. 2007).
Tomohiro, Nakatani et al., "Importance of Energy and Spectral Features in Gaussian Source Model for Speech Dereverberation", IEEE Workshop on Application of Signal Processing to Audio and Acoustics (WASPAA-2007), p. 299-302, (2007).
Gaubitch, D. Nikolay et al., "Subband Method for Multichannel Least Squares Equalization of Room Transfer Functions", Proceedings IEEE Workshop on Applications of Signal Processing to Audio and Acoustics, (WASPAA-2007), p. 14-17, (2007).
Miyoshi, Masato: "Estimating AR Parameter-Sets for Linear-Recurrent Signals in Convolutive Mixtures", $4^{th}$ International Symposium on Independent Component Analysis and Blind Signal Separation, (ICA-2003), p. 585-589, (Apr. 2003).
Kinoshita, Keisuke et al., "Spectral Subtraction Steered by Multi-Step Forward Linear Prediction for Single Channel Speech Dereverberation", Proc., ICASSP-2006, vol. I, p. 817-820, (May 2006).
Portnoff, R. Michael: "Implementation of the Digital Phase Vocoder Using the Fast Fourier Transform", IEEE Transactions on Acoustics, Speech, and Signal Processing, vol. 24, No. 3, pp. 243-248, (Jun. 1976).
Reilly, P. James et al., "The Complex Subband Decomposition and its Application to the Decimation of Large Adaptive Filtering Problems" IEEE Transactions on Signal Processing, vol. 50, No. 11, pp. 2730-2743, (Nov. 2002).

* cited by examiner

DEREVERBERATION APPARATUS, DEREVERBERATION METHOD, DEREVERBERATION PROGRAM, AND RECORDING MEDIUM

TECHNICAL FIELD

The present invention relates to a dereverberation apparatus, a dereverberation method and a dereverberation program and a recording medium for removing a reverberation signal from an observation signal.

BACKGROUND ART

In the following description, a signal emitted from a sound source is referred to as an audio signal, and an audio signal produced in a reverberant room and collected by a plurality of sound collecting means (microphones, for example) is referred to as an observation signal. The observation signal is the audio signal on which a reverberation signal is superimposed. It is difficult to extract characteristics of the original audio signal from the observation signal, and the resulting sound has a decreased clarity. A dereverberation processing removes the superimposed reverberation signal from the observation signal to facilitate extraction of the characteristics of the original audio signal and recover the sound clarity. This technique can be applied to various audio signal processing systems as a constituent technology to improve the entire performance of the system. Audio signal processing systems to which the dereverberation processing can be applied as a constituent technology to improve the performance include:

(1) a speech recognition system that uses the reverberation signal removal as a preprocessing;

(2) a communication system, such as a teleconference system, that uses the reverberation signal removal to improve the sound clarity;

(3) a playing system that removes a reverberation signal in recorded speech to improve the clarity of the recorded sound;

(4) a hearing aid that removes a reverberation signal to improve the listenability;

(5) a machine-controlled interface and a human-machine interactive system that issue a command to a machine in response to a human voice;

(6) a post-production system that improves the sound quality of acoustic contents containing reverberation signals recorded during production; and (7) an acoustic effecter that performs an acoustic control of music contents by removing or adding a reverberation signal.

FIG. 1 shows an exemplary functional configuration of a conventional dereverberation apparatus 100 (referred to as a related art 1 hereinafter). The dereverberation apparatus 100 comprises an estimating section 104, a removing section 106, and a sound source model storage section 108. The sound source model storage section 108 stores a finite state machine model of a waveform in a short time period of an audio signal containing no reverberation signal and a sound source model that represents a characteristic of a waveform in each state as an autocorrelation function of the signal. In addition, using an operation to apply a dereverberation filter to an observation signal in the time domain and the sound source model described above, an optimization function that represents the likelihood of the signal resulting from removal of the reverberation signal from the observation signal (an ideal target signal) is previously defined. The optimization function has a dereverberation filter coefficients and a state time series of the sound source model as parameters and is designed to assume a larger value when more appropriate filter coefficient or state time series is given.

In the following description, input observations signals in the time domain are denoted by $x_t^{(1)}, \ldots, x_t^{(q)}, \ldots, x_t^{(Q)}$. The subscript "t" represents a discrete time index, and the superscript "q" (q=1, . . . , Q) represents a sound collecting means index (a microphone index, for example). In the following, a microphone with an index q is referred to as a microphone for a q-th channel. This holds true for the following description.

When the observation signal $x_t^{(q)}$ is input, the estimating section 104 estimates a dereverberation filter using the observation signal $x_t^{(q)}$ and the optimization function described above. More specifically, the estimating section 104 estimates the dereverberation filter by determining a parameters that maximizes the value of the optimization function. The removing section 106 convolves the observation signal with the estimated dereverberation filter to remove the reverberation signal from the observation signal and outputs the resulting signal. The signal is referred to as a target signal.

FIG. 2 shows an exemplary functional configuration of a conventional dereverberation apparatus 200 (referred to as a related art 2 hereinafter). The dereverberation apparatus 200 comprises a dividing section 202 that divides an observation signal into U frequency bands, a storage section 204$_u$ (u=0, . . . , U−1) provided for each frequency band, a removing section 206$_u$ provided for each frequency band, and an integrating section 208.

The dividing section 202 divides the observation signal into subband signals for the U frequency bands. The resulting subband signals are time-domain signals. When the observation signal is divided into the subband signals, down-sampling (thinning out of the samples) may be performed. In the following description, a subband signal is denoted by $x'^{(q)}_{n,u}$. In this expression, n represents a sample index after down-sampling, and u represents a frequency band index (u=0, . . . , U−1). In the following, a subband signal $x'^{(q)}_{n,u}$ in a u-th frequency band of the observation signal $x_t^{(q)}$ collected by a microphone for a q-th channel will be described.

As described above, the removing section 206$_u$ (u=0, . . . , U−1) and the storage section 204$_u$ are provided for each of the U frequency bands. The storage section 204$_u$ stores the dereverberation filter. By using a previously determined room transfer function from a sound source to each microphone, a coefficient of the dereverberation filter is previously determined on the basis of the least square error criterion so that the input/output function of the entire system, which is obtained by applying the room transfer function, the subband division processing by the dividing section 202, the dereverberation processing by the removing section 206$_u$ and the integration processing by the integrating section 208 in order, may be a unit impulse function as far as possible.

The removing section 206$_u$ removes the reverberation signal from the subband signal by convolving the subband signal $x'^{(q)}_{n,u}$ with the dereverberation filter. The subband signal for each frequency band from which the reverberation signal is removed is referred to as a frequency-specific target signal $s^{\sim}_{n,u}$. Then, the integrating section 208 integrates the frequency-specific target signals $s_{n,u}^{\sim}$ (u=0, . . . , U−1) to determine a target signal $s_t^{\sim}$.

Details of the dereverberation apparatuses 100 and 200 are described in Non-Patent literatures 1, 2 and 3.

Non-Patent literature 1: T. Nakatani, B. H. Juang, T. Hikichi, T. Yoshioka, K. Kinoshita, M. Delcroix, and M. Miyoshi, "Study on speech dereverberation with autocorrelation codebook", Proc. IEEE International Conference on Acoustics, Speech, and Signal Processing (ICASSP-2007), vol. I, pp. 193-196, April 2007

Non-Patent literature 2: T. Nakatani, B. H. Juang, T. Yoshioka, K. Kinoshita, M. Miyoshi, "Importance of energy and spectral features in Gaussian source model for speech dereverberation", WASPAA-2007, 2007

Non-Patent literature 3: N. D. Gaubitch, M. R. P. Thomas, P. A. Naylor, "Subband Method for Multichannel Least Squares Equalization of Room Transfer Functions," Proc. IEEE Workshop on Applications of Signal Processing to Audio and Acoustics (WASPAA-2007), pp. 14-17, 2007

DISCLOSURE OF THE INVENTION

In order to optimally use time-varying characteristics of an audio signal, the dereverberation apparatus 100 according to the related art 1 described above has to calculate an extremely large covariance matrix to achieve the calculation to maximize the value of the optimization function. Thus, the maximization of the value of the optimization function requires an enormous amount of calculation time. The reason why the covariance matrix has such a large size will be described below. A covariance matrix H(r) for the observation signal handled in the related art 1 is expressed by the following formula (1).

$$H(r) = \sum_{t} X_{t-1}^{T} r_t^{-1} X_{t-1} \tag{1}$$

In the following description, the covariance matrix H(r) is a covariance matrix for the observation signal handled in the related art 1. Assuming that two microphones collect one audio signal, $X_{t-1}=[x^{-}{}_{t-1}{}^{(1)}, \ldots, x^{-}{}_{1-K}{}^{(1)}, x^{-}{}_{t-1}{}^{(2)}, \ldots, x^{-}{}_{t-K}{}^{(2)}]$, where $x^{-}{}_{t}{}^{(1)}$ is a column vector composed of short-time frames of $x_t^{(1)}$ having a length of N ($x^{-}{}_{t}{}^{(1)}=[x_{t+1}{}^{(1)}, \ldots, x_{t+N-1}{}^{(1)}]^T$), and $x_t^{(1)}$ and $x_t^{(2)}$ are observation signals collected by microphones for the first channel and the second channel, respectively. T represents transposition of a matrix or a vector. K represents the length of a prediction filter (estimated dereverberation filter). $r_t$ represents a covariance matrix $E\{s^{-}{}_{t} s^{-}{}_{t}{}^{T}\}$ for a column vector $s^{-}{}_{t}=[s_t, s_{t+1}, s_{t+N-1}]^T$ composed of short time frames of the audio signal ($r_t=E\{s^{-}{}_{t} s^{-}{}_{t}{}^{T}\}$), where $E\{\cdot\}$ represents an expected value function. In general, the covariance matrix $r_t$ is not known, and therefore, an estimated value determined by the estimating section 104 on the basis of the sound source model stored in the sound source model storage section 108 is used.

In general, at least theoretically, the length of K of the prediction filter has to be equal to the length of the room impulse response. Therefore, the size of the covariance matrix H(r) is extremely large. However, if it is assumed that the audio signal is a stationary signal, the covariance matrix approximates to a correlation matrix, and therefore, a fast calculation method, such as the fast Fourier transform, can be used. However, if this assumption is applied to a time-varying signal, such as a voice signal, the calculation precision of the dereverberation disadvantageously decreases. As described above, the dereverberation apparatus 100 requires an enormous amount of calculation time to achieve dereverberation with high precision and cannot achieve the dereverberation in a shorter time without deteriorating the precision of the dereverberation in the case where the audio signal is a time-varying signal.

The dereverberation apparatus 200 according to the related art 2 described above has to previously estimate the dereverberation filter (an inverse filter of the room transfer function) and previously determine the room transfer function. In addition, the dereverberation using the inverse filter of the room transfer function is highly sensitive to an error of the room transfer function. If the room transfer function has a certain level of error, the dereverberation processing increases the distortion of the audio signal. In addition, the room transfer function is sensitive to a change of the position of the sound source or the room temperature. Thus, if the position of the sound source or the room temperature cannot be precisely determined in advance, the room transfer function cannot be precisely determined. As described above, the dereverberation apparatus 200 has to previously prepare the precise room transfer function, and a room transfer function determined under a certain condition can be applied to dereverberation only under extremely limited conditions.

Thus, the present invention performs dereverberation as described below. A storage section stores a sound source model that represents an audio signal as a probability density function. An observation signal obtained by collecting an audio signal is converted into frequency-specific observation signals associated with a plurality of frequency bands. Then, on the basis of the sound source model and a reverberation model that represents a relationship for each frequency band among the audio signal, the observation signal and a dereverberation filter, a dereverberation filter for each frequency band is estimated using the corresponding frequency-specific observation signal. Each dereverberation filter is applied to the corresponding frequency-specific observation signal to determine a frequency-specific target signal for the frequency band, and then, the frequency-specific target signals are integrated.

DESCRIPTION OF EMBODIMENTS

Figure 1:
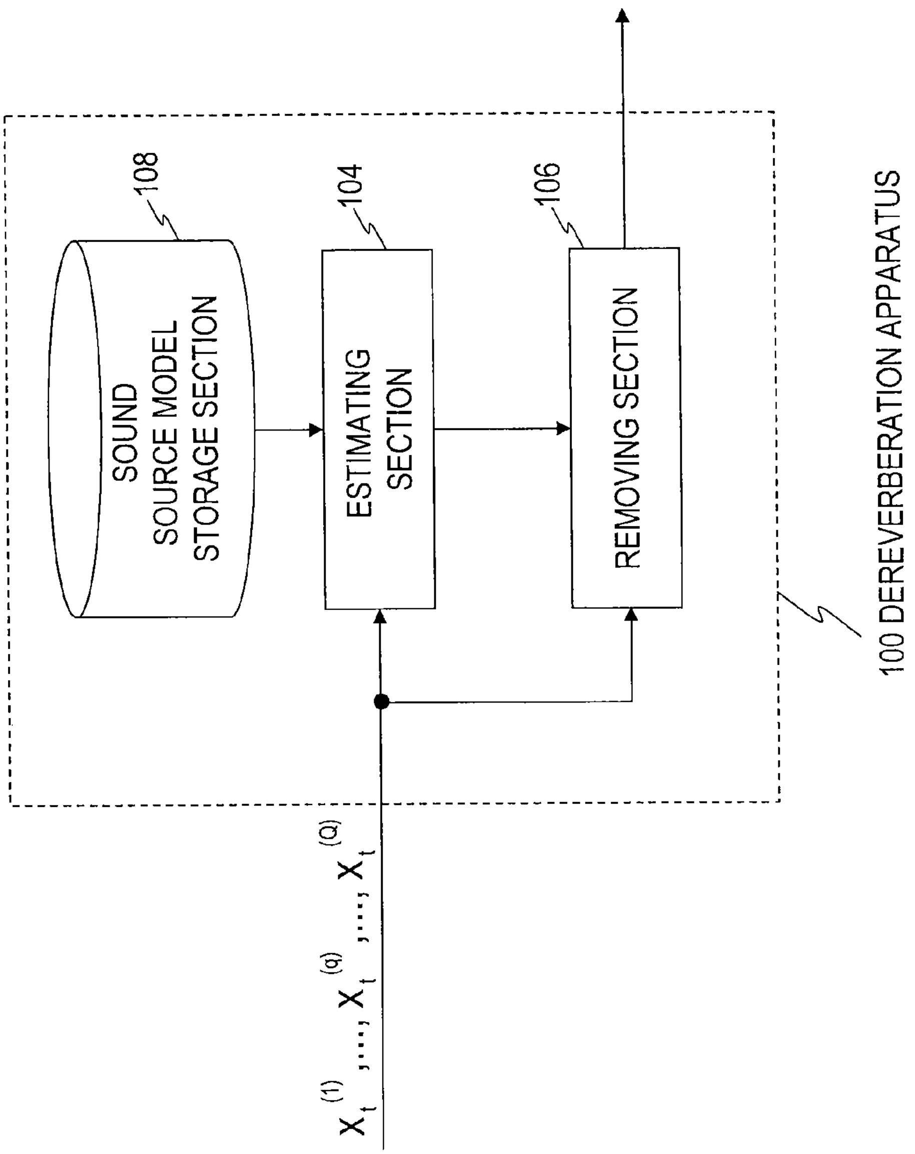
FIG.1 PRIOR ART
FIG. 1 is a block diagram showing an exemplary functional configuration of a dereverberation apparatus according to a related art 1.
Figure 2:
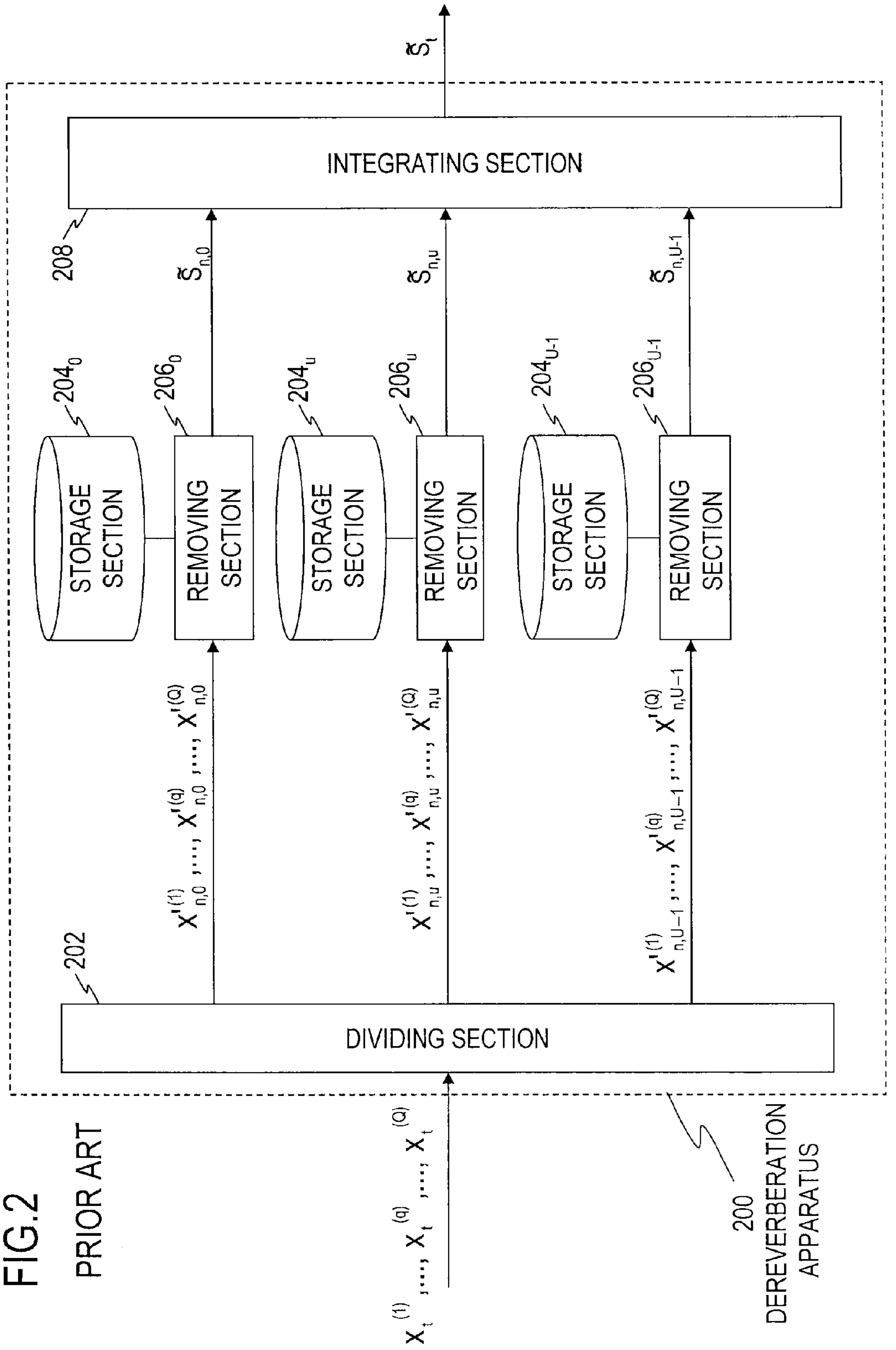
FIG.2 PRIOR ART
FIG. 2 is a block diagram showing an exemplary functional configuration of a dereverberation apparatus according to a related art 2.

In the following, best modes for carrying out the present invention will be described. Components having the same functions or steps of performing the same processings are denoted by the same reference numerals, and redundant descriptions thereof will be omitted.

Embodiment 1

Figure 3:
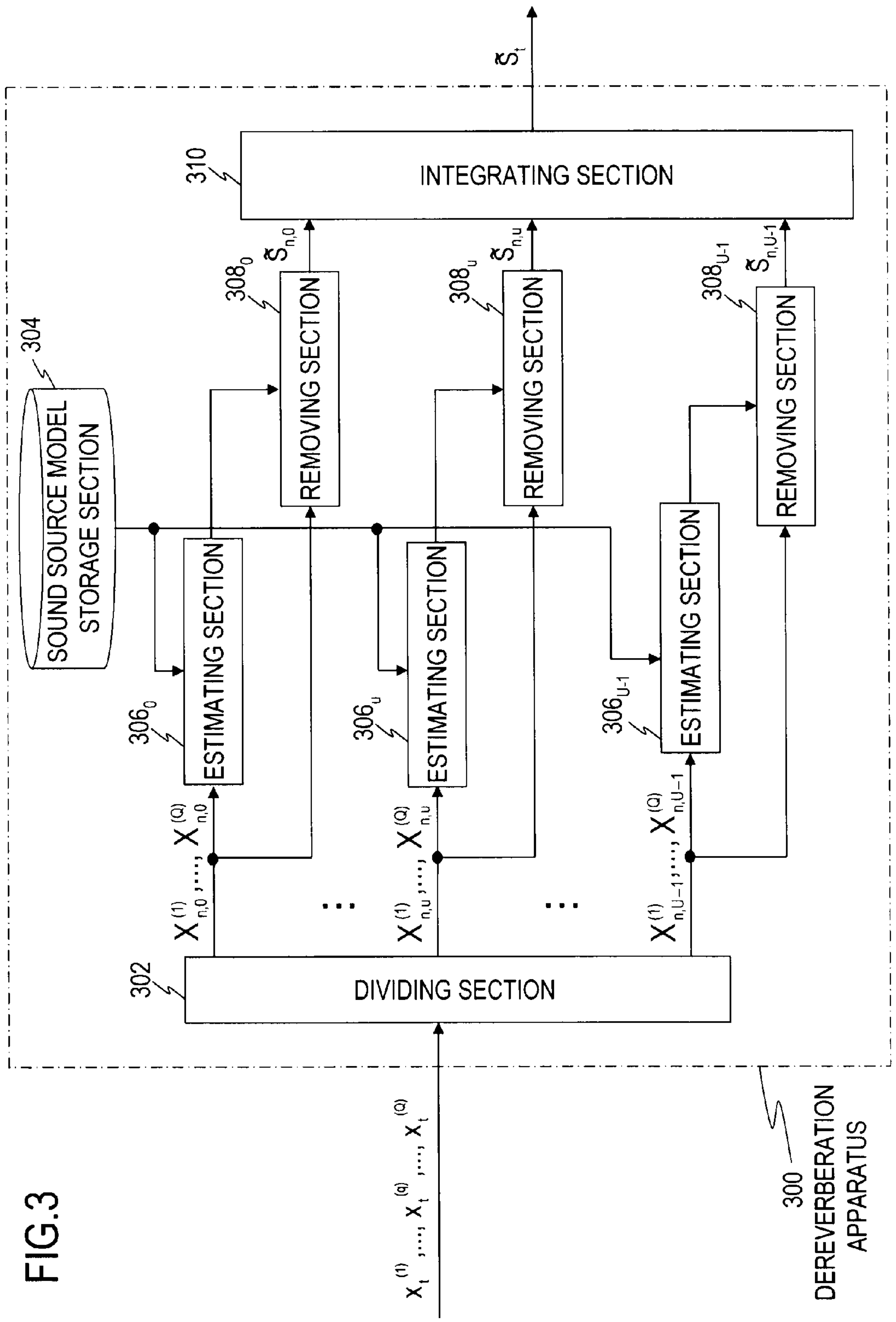
FIG. 3 is a block diagram showing an exemplary functional configuration of a dereverberation apparatus according to an embodiment 1.
Figure 4:
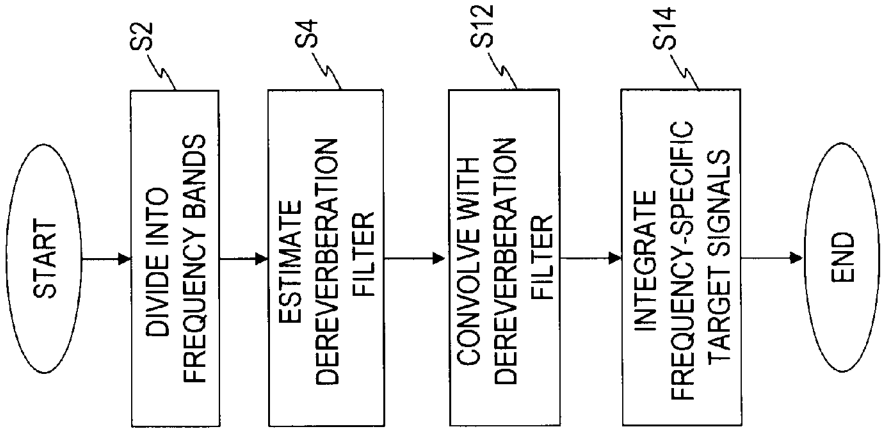
FIG. 4 is a flow chart generally showing a process performed by the dereverberation apparatus according to the embodiment 1.

FIG. 3 is a block diagram showing a dereverberation apparatus 300 according to an embodiment 1, and FIG. 4 shows a general flow of a process performed by the dereverberation apparatus 300. As shown in FIG. 3, the dereverberation apparatus 300 according to the embodiment 1 comprises a dividing section 302 that divides an observation signal into U frequency bands, a sound source model storage section 304, an estimating section $\mathbf{306}_u$ (u=0, . . . , U−1) provided for each frequency band, a removing section $\mathbf{308}_u$ provided for each frequency band, and an integrating section 310.

The dividing section 302 divides the observation signal into individual frequency bands and down-samples the observation signals to output frequency-specific observation signals. The dividing section 302 according to the embodiment 1 divides the observation signal on a frequency band basis by applying a short-time analysis window to the observation signal by temporally shifting the short-time analysis window and converting the observation signal into a frequency-domain signal.

The sound source model storage section 304 stores a sound source model that represents a characteristic of a frequency-specific observation signal for each frequency band.

The estimating section $\mathbf{306}_u$ is provided for each frequency band and estimates a dereverberation filter from the frequency-specific observation signal on the basis of an optimization function for the observation signal defined in association with the sound source model.

The removing section $\mathbf{308}_u$ is also provided for each frequency band and determines a frequency-specific target signal for each frequency band by using the frequency-specific observation signal and the dereverberation filter. The removing section $\mathbf{308}_u$ according to the embodiment 1 determines the frequency-specific target signal by convolving the frequency-specific observation signal with the dereverberation filter.

The integrating section 310 integrates the frequency-specific target signals to output a target signal described later. The integrating section 310 according to the embodiment 1 outputs the target signal described later by integrating the frequency-specific target signals and thereafter by converting it into a single time-domain signal for the entire frequency band.

First, a relationship between an audio signal $s_t$ and an observation signal $x_t^{(q)}$ will be described. In the following description, it is assumed that room transfer functions from the sound source to the microphones have no common zero, and the microphone closest to the sound source is denoted by q=1 (referred to as a microphone for a first channel). The relationship between the audio signal and the observation signal can be expressed by the formula (11) below. For more details, see M. Miyoshi, "Estimating AR parameter—sets for linear—recurrent signals in convolutive mixtures," Proc. ICA-2003, pp. 585-589, 2003.

$$x_t^{(1)} = \sum_{q=1}^{Q}\sum_{\tau=1}^{K} c_\tau^{(q)} x_{t-\tau}^{(q)} + h_0^{(1)} s_t \tag{11}$$

In this formula, $h_0^{(1)}$ represents the first tap value of a room impulse response from the sound source to the microphone q=1, $c_\tau^{(q)}$ represents a prediction coefficient of the dereverberation filter estimated by the estimating section $\mathbf{306}_u$, τ represents a discrete time index, and K represents a prediction filter length (size of the dereverberation filter estimated in the related art 1) as described earlier.

If the gain of the audio signal is ignored, the second term $h_0^{(1)}s_t$ of the right side represents the audio signal $s_t$ multiplied by a constant and thus can be regarded as the audio signal $s_t$ to be estimated. Therefore, the formula (11) can be rewritten as the following formula (12).

$$x_t^{(1)} = \sum_{q=1}^{Q}\sum_{\tau=1}^{K} c_\tau^{(q)} x_{t-\tau}^{(q)} + s_t \tag{12}$$

According to the formula (12), the current observation signal $x_t^{(q)}$ is predicted from a time series $x_{t-\tau}^{(q)}$ of previous observation signals, and the audio signal $s_t$ is regarded as a prediction residual signal. Although the formula (12) is based on the assumption that the microphone for the first channel (q=1) is the microphone closest to the sound source, the relationship between the observation signal and the audio signal can be expressed by the same formula (12) even when the assumption does not hold. That is, if an adequate delay is introduced to the observation signals of the microphones other than the microphone (q=1) for the first channel, the microphone (q=1) for the first channel can be virtually regarded as the first microphone that receives the sound from the sound source and thus can be handled as the microphone closest to the sound source. Thus, for example, if it is assumed that the delay time introduced to a microphone q is $d^{(q)}$ taps, it can be considered that a fixed value 0 is substituted into the first $d^{(q)}$ taps of the prediction coefficients $\{c_1^{(g)}, c_2^{(q)}, \ldots, c_K^{(q)}\}$ for the microphones other than the microphone q=1, so that the relationship between the observation signal and the audio signal can be expressed by the formula (12).

When the observation signals $x_t^{(q)}$ are input to the dividing section 302, the dividing section 302 divides the relevant observation signal into individual frequency bands and down-samples the observation signals to output frequency-specific observation signals (step S2). The dividing section 302 according to the embodiment 1 divides the observation signal on a frequency band basis by applying a short-time analysis window to the observation signal by temporally shifting the short-time analysis window and converting the observation signal into a frequency-domain signal. For example, the dividing section 302 performs a short-time Fourier transform. In the following specific description, it is assumed that the dividing section 302 performs a short-time Fourier transform.

Next, the formula (12) described above is generalized into the following formula (12').

$$x_t^{(1)} = \sum_{q=1}^{Q}\sum_{\tau=1}^{K} c_\tau^{(q)} x_{t-\tau}^{(q)} + \tilde{s}_t \tag{12'}$$

In this formula, d represents a constant to introduce a delay to a previous observation signal used to predict the current observation signal. When d=1, the formula (12') is the same as the formula (12). When d>1, the formula (12') cannot strictly express the relationship between the observation signal and the audio signal. The previous signal series of the right side of the formula (12') does not include signals derived from the audio signals for the previous d taps from the current time t, and therefore, reverberation signals derived from the audio signals in the time period contained in the current observation signal cannot be expressed by a linear combination of previous observation signals. The "reverberation signals derived from the audio signals in the time period contained in the current observation signal" correspond to an initial reflected sound for the first d taps of the room impulse response. Therefore, the formula (12') is based on the assumption that the residual signal contains the initial reflected sound in addition to the audio signal. In order to make this clear, the residual signal is denoted by $s_t^{\sim}$. In this specification, a symbol $A_\alpha^{\sim}$ represents a combination of a symbol A and a symbol ~ directly above the symbol A.

<Convolution Operation of Frequency Signal>

Next, a method of performing on a frequency-domain signal an operation corresponding to convolution in the time domain included in the first term of the right side of the formula (12') will be described. First, a signal resulting from convolving an audio signal $x_t$ with a dereverberation filter $c_t$ having a filter length of K in the time domain is denoted by $y_t$. A signal in a short time frame extracted from the signal $y_t$ beginning at a time t0 by a time window of a window function is expressed by the following formula (13) in a z transform domain.

$$W_N(y(z)z^{t0})=W_N(c(z)\cdot x(z)z^{t0}) \tag{13}$$

In this formula, y(z)=c(z)·x(z), the symbol · represents convolution, and $W_N(\ )$ represents a function corresponding to a window function having a length of N in the time domain. $W_N(c(z))$ means extracting (−N+1)-th order to 0-th order terms from c(z), changing the respective coefficients in proportion to the shape of the window, and removing the terms outside the window. $z^{t0}$ represents a time shift operator to shift the short time frame beginning at the time t0 into the window function.

Extraction of a frame having a length of M from the filter coefficient $c_t$ at the time t is represented as $c_{t,M}(z)=W_M^R(c(z)z^t)$, where $W_M^R(\ )$ represents a short time analysis window (rectangular window) having a length of M. Then, obviously, $c(z)=\Sigma_\tau c_{\tau M,M}(z)z^{-\tau M}$. The formula (13) described above can be transformed as follows.

$$\begin{aligned} W_N(y_{t0,N}(z)) &= W_N\left(\sum_{\tau=0}^{K_R} c_{\tau M,M}(z)z^{-\tau M}x(z)z^{t0}\right) && (14)\\ &= \sum_{\tau=0}^{K_R} W_N(c_{\tau M,M}(z)x(z)z^{t0-\tau M}) && (15)\\ &= \sum_{\tau=0}^{K_R} W_N(c_{\tau M,M}(z)x_{t0-M+1-\tau M,M+N-1}(z)z^{M-1}) && (16) \end{aligned}$$

$\Sigma\tau c_{\tau M,M}(z)z^{-\tau M}$ in the formula (14), corresponds to c(z) (see the formula (13)), and $x_{t0-m+1-\tau M,M+N-1}(z)$ in the formula (16) corresponds to x(z) (see the formula (13)).

In addition, $K_R$=<K/M>, where <K/M> represents the smallest integer not less than K/M. $K_R$ is a filter length (number of taps) of the dereverberation filter estimated by the estimating section 306$_u$. The formula (16) is derived from the formula (15) by removing the terms outside the window from the terms included in the argument of the window function of the formula (15).

The term $c_{\tau M,M}(z)x_{t0-M+1-\tau M,M+N-1}(z)$ in the formula (16) is a product in a z domain of a frame having a length of M extracted from the τM-th tap of the filter coefficient $c_\tau$ in the time domain and a frame having a length of M+N−1 extracted from the observation signal $x_t$ in the time domain at a time t0−M+1−τM. Since multiplication in the z domain is equivalent to a convolution operation, the term represents a convolution operation in the time domain of the observation signal $x_t$ in the frame and the filter coefficient $c_t$ in the frame. In addition, the frame length of $c_{\tau M,M}(z)$ is M, and the frame length of $x_{t0-M+1-\tau M,M+N-1}(z)$ is M+N−1. Thus, when the number of points (number of frequency bands) U of the short time Fourier transform is equal to or more than 2M+N−2 (U≧2M+N−2), the convolution in the time domain is strictly represented by the product in the short time Fourier transform domain. Then, an approximation used in many audio signal processings is used. That is, the convolution of the signal included in the short time analysis window with the filter approximates to the product of the signal and the filter in the short time Fourier transform domain, if the length of M of the filter is adequately shorter than the length of N of the short time analysis window. Using this approximation, the formula (16) can be transformed into the following formula (17) on a unit circle in the z domain (which corresponds to the short time Fourier transform domain).

$$W_N(y_{t_0,N}(z)) \approx \sum_{\tau=0}^{K_R} W_N^R(c_{\tau M,M}(z))W_N(x_{t_{0-\tau}M,N}(z)) \tag{17}$$

In the short-time Fourier transform representation, the formula (17) can be transformed into the following formula (18).

$$Y_n \approx \sum_{\tau=0}^{K_R} \mathrm{diag}(X_{n-\tau})C_\tau \tag{18}$$

In this formula, n and τ represent short time frame indices, $Y_n$, $C_n$ and $X_n$ represent vectors whose elements are values of signals for each frequency band extracted with a time window from time-domain signals corresponding to y(z), c(z) and x(z) and subjected to the short time Fourier transform, respectively, and diag(x) represents a diagonal matrix having the components of the vector X as the diagonal components. In this specification, the short time Fourier transform is expressed as follows. In the following formulas, $t_\tau$ represents a discrete time index of the first sample in a frame τ.

$$X_{\tau,u} = \sum_{t=0}^{U-1} x_{t_\tau+t}\exp(-j2\pi ut/U) \tag{19}$$

$$X_\tau = [X_{\tau,0}\ X_{\tau,1}\ \ldots\ X_{\tau,U-1}]^T \tag{20}$$

According to the formula (18), the convolution operation in the time domain can be performed as a convolution operation of the frequency-specific observation signal for each frequency band. In the formula (17), M is a value corresponding to frame shifting, and therefore, the frame shift M has to be adequately small compared with the window length of N of the window function $W_N(\ )$ in this approximate calculation.

This is the end of the supplementary explanation of <Convolution Operation of Frequency Signal>.

Performing the short-time Fourier transform on the both sides of the formula (12') by using the formula (16) results in the following formula (22).

$$X_n^{(1)} = \sum_{q=1}^{Q}\sum_{\tau=D}^{K_R} \mathrm{diag}(X_{n-\tau}^{(q)})C_\tau^{(q)} + \tilde{S}_n \tag{22}$$

The formula (22) is equivalent to the formula (22a).

$$X_{n,u}^{(1)} = \sum_{q=1}^{Q}\sum_{\tau=D}^{K_R} X_{n-\tau,u}^{(q)}C_{\tau,u}^{(q)} + \tilde{S}_{n,u} \tag{22a}$$

In this formula, D corresponds to the delay d in the formula (12') and represents the delay introduced to previous observation signals in the frequency domain in the form of the number of frames. Frequency signals in adjacent frames overlap with each other in the time domain. Therefore, part of the audio signal included in the observation signal (the left side $X_n^{(1)}$ of the formula (22)) in the frame n is also included in the observation signal corresponding to the immediately-previous frame. Therefore, if $X_n^{(1)}$ is predicted using the previous observation signal including the immediately-previous frame according to the formula (22), part of the audio signal can also be predicted. Since the predictable part of the observation signal is not included in the residual signal, this means that the part of the audio signal is removed by the dereverberation. To avoid this, according to the present invention using the frequency signal, the observation signal in the immediately-previous frame is not used to predict the current observation signal, but only a previous observation signal spaced away by a certain delay D or more is used as shown in the formula (22). When d=DM, the formula (12') agrees with the formula (22). In the following, this embodiment will be described using the formula (22) as a formula that represents a relationship between the observation signal and the audio signal. In the formula (22), $X_n^{(q)}$ corresponds to the short time Fourier transform for a time-domain signal collected by a microphone for a q-th channel. The short time Fourier transform follows the formulas (19) and (20). Here, n represents the frame identification number. The frequency-specific observation signal in a frequency band u (u=0, . . . , U−1) is represented by $X_{n,u}^{(q)}$. In order to determine the frequency-specific observation signal $X_{n,u}^{(q)}$, the dividing section 302 applies the short time analysis window by temporally shifting the window in steps of M samples and performs conversion into the frequency domain. In this way, the frequency-specific observation signal $X_{n,u}^{(q)}$ for each frequency band is obtained.

The estimating section 306$_u$ described in detail later estimates the dereverberation filter for removing a reverberation from the frequency-specific observation signal $X_{n,u}^{(q)}$. Once the prediction coefficient $C_\tau^{(q)}$, which is a coefficient of the dereverberation filter, is obtained, the target signal (the audio signal containing the initial reflected sound) $\tilde{S}_n$ can be estimated as follows.

$$\tilde{S}_n = X_n^{(1)} - \sum_{q=1}^{Q}\sum_{\tau=D}^{K_R} \mathrm{diag}(X_{n-\tau}^{(q)})C_\tau^{(q)} \tag{23}$$

The formula (23) can be transformed into the following formula (24) to express the element for each frequency band of the target signal $\tilde{S}_n=[\tilde{S}_{n,0}, \tilde{S}_{n,1}, \ldots, \tilde{S}_{n,U-1}]$.

$$\tilde{S}_{n,u} = X_{n,u}^{(1)} - \sum_{q=1}^{Q}\sum_{\tau=D}^{K_R} X_{n-\tau,u}^{(q)}C_{\tau,u}^{(q)} \tag{24}$$

The formula (24) can be transformed into the formula (29) using the formulas (25) to (28).

$$C_u=[C_u^{(1)},C_u^{(2)} \ldots C_u^{(Q)}] \tag{25}$$

$$C_u^{(q)}=[C_{D,u}^{(q)},C_{D+1,u}^{(q)} \ldots C_{K_R,u}^{(q)}] \tag{26}$$

$$B_{n-D,u}=[B_{n-D,u}^{(1)},B_{n-D,u}^{(2)} \ldots B_{n-D,u}^{(Q)}] \tag{27}$$

$$B_{n-D,u}^{(q)}=[X_{n-D,u}^{(q)},X_{n-D-1,u}^{(q)} \ldots X_{n-K,u}^{(q)}] \tag{28}$$

$$\tilde{S}_{n,u}=X_{n,u}^{(1)}-B_{n-D,u}C_u^{T} \tag{29}$$

T represents transposition of a vector or a matrix. In this embodiment, $C_u$ represents the dereverberation filter for the u-th frequency band. The term $B_{n-D,u}C_u^T$ of the formula (29) corresponds to the signals obtained by convolution of $B_{n,u}^{(q)}$ with $C_u^{(q)}$ for each channel added to each other for all the values of the index q. The estimating section 306$_u$ estimates the dereverberation filter $C_u$, and the removing section 308$_u$ removes the reverberation signal according to the formula (29).

Assuming that $0_{D-1}$ represents a (D−1)-dimensional row vector all the elements of which are 0, the dereverberation filter $W_u$ can also be defined as follows.

$$W_u=[1,0_{D-1},C_u^{(1)},0,0_{D-1},C_u^{(2)}, \ldots ,0,0_{D-1},C_u^{(Q)}]$$

In this case, the removing section 308$_u$ removes the reverberation signal according to the following formulas.

$$\tilde{S}_{n,u}=\zeta_{n,u}W_u^{T}$$

$$\zeta_{n,u}[\zeta_{n,u}^{(1)}\zeta_{n,u}^{(2)} \ldots \zeta_{n,u}^{(Q)}]$$

$$\zeta_{n,u}^{(q)}=[X_{n,u}^{(q)}X_{n-1,u}^{(q)} \ldots X_{n-K_R,u}^{(q)}] \tag{30}$$

As described above, if the estimating section 306$_u$ can estimate the dereverberation filter $C_u$ or $W_u$, the removing section 308$_u$ can remove the reverberation signal according to the formula (29) or (30). Next, the sound source model will be described before describing the estimation of the dereverberation filter.

The sound source model storage section 304 stores a sound source model that represents a characteristic of a frequency-specific observation signal for each frequency band.

The sound source model according to this embodiment represents the tendency of the possible values of the audio signal in the form of a probability distribution. The optimization function is defined on the basis of the probability distribution. A useful example of the sound source model is a time-varying normal distribution, and the probability density function of the frequency-specific signal $S_n^{\sim}$ to be determined is defined as follows.

$$p(S_n^{\sim})=N(S_n^{\sim};0,\Psi_n) \quad (31)$$

$$\Psi_n \in \Omega_\Psi \quad (32)$$

$N(s_n^{\sim}; 0, \Psi_n)$ represents a multidimensional complex normal distribution with an average being 0 and a covariance matrix of the sound source model being $\Psi_n=E(S_n^{\sim}(S_b^{\sim})^{*T})$, and $\Psi_n$ assumes a different or common value for each short time frame n. In the following description, $\Psi_n$ is referred to as a model covariance matrix, and it is assumed that the model covariance matrix $\Psi_n$ is a diagonal matrix that has a different value for each short time frame n. The symbol * represents complex conjugate. $\Omega_\Psi$ represents a set of all the possible values of $\Psi_n$ (in other words, a parametric space of $\Psi_n$). Assuming that $\psi_{n,u}^2=E(S_{n,u}^{\sim}S_{n,u}^{\sim *T})$ represents a u-th diagonal element of $\Psi_n$, the probability density function is defined as follows independently for each frequency band, since $\Psi_n$ is a diagonal matrix.

$$p(S_{n,u}^{\sim})=N(S_{n,u}^{\sim};0,\psi_{n,u}^2) \quad (33)$$

The estimating section 306$_u$ provided for each frequency band estimates the dereverberation filter from the frequency-specific observation signal on the basis of the optimization function of the observation signal defined in association with the sound source model (step S4). Next, the estimation of the dereverberation filter will be described in detail.

As shown by the formula (25), the dereverberation filter $C_u$ is represented by a vector composed of the prediction coefficients $C_u^{(q)}$ of the observation signal for all the microphones. The prediction coefficients $C_u^{(q)}$ are prediction coefficients in the frequency domain. $\psi_u^2$ represents a time series of u-th diagonal elements of the model covariance matrix, and $\psi_u^2=\{\psi_{n,u}^2\}$. In addition, $\theta_u=\{C_u, \psi_u^2\}$ represents a set of estimation parameters. In addition, a set of all the estimation parameters for all the frequency bands is represented by $\theta=\{\theta_0, \theta_1, \ldots, \theta_{U-1}\}$. A log likelihood function $L_u(\theta_u)$ as the optimization function for each frequency band and a log likelihood function $L(\theta)$ as the optimization function for all the frequency bands are defined as follows.

$$L_u(\theta_u)=\sum_n \log p(X_{n,u}^{(q)} \mid B_{n-D,u};\theta_u) \quad (34)$$

$$L(\theta)=\sum_u L_u(\theta_u) \quad (35)$$

On the basis of the formulas (29) and (33), the formula (34) can be transformed into the following formula (36).

$$L_u(\theta_u)=\sum_n \log N(X_{n,u}^{(1)}; B_{n-D,u}C_u^T, \psi_{n,u}^2) \quad (36)$$

By estimating a parameter that maximizes the left side of the formula (35), the prediction coefficients $C_u^{(q)}$ of the dereverberation filters can be determined. Maximization of the formula (35) can be achieved by the optimization algorithm described below.

1. Determine an initial value for all the frequency bands u according to the following formula (37), for example.

$$C_{n,u}^{(q)}=0 \quad (37)$$

2. Repeat the following two formulas until convergence is achieved.

2-1. Update the model covariance matrix $\Psi_n$ to maximize the optimization function $L(\theta)$ with $C_{n,u}^{(q)}$ being fixed for all the frequency bands u.

$$\hat{\Psi}_n = \underset{\Psi\in\Omega_\Psi}{\operatorname{argmax}}\, L(\theta) \longrightarrow \Psi_n \quad (38)$$

2-2. Update the dereverberation filter $C_u$ to maximize the optimization function $L_u(\theta_u)$ for all the frequency bands u with $\Psi_n$ being fixed.

$$\hat{C}_u = \left(\sum_n \frac{B_{n-D,u}^{*T}B_{n-D,u}}{\psi_{n,u}^2}\right)^+ \sum_n \frac{B_{n-D,u}^{*T}X_{n,u}^{(1)}}{\psi_{n,u}^2} \longrightarrow C_u \quad (39)$$

In the above description of the algorism, an operation to update the value of a parameter A to B is expressed as "A→B". Furthermore, the symbol "+" represents a Moore-Penrose pseudo inverse matrix. A covariance matrix $H'(\phi_{n,u}^2)$ for the observation signal that has to be calculated in the algorism described above is expressed by the following formula (40).

$$H'(\phi_{n,u}^2) = \sum_n \frac{B_{n-D,u}^{*T}B_{n-D,u}}{\phi_{n,u}^2} \quad (40)$$

On the basis of the optimization algorism, the dereverberation filter is constructed from $C_u$ finally obtained. The removing section 308$_u$ determines the frequency-specific target signals $S_{n,u}^{\sim}$ by removing the reverberation signal from the frequency-specific observation signals $X_{n,u}^{(q)}$ by convolving the frequency-specific observation signals $X_{n,u}^{(q)}$ with the dereverberation filter $C_u$ or $W_u$ (step S12).

Then, the integrating section 310 integrates the frequency-specific target signals $S_{n,u}^{\sim}$ for the frequency bands, converts the signals into the time domain, and outputs the target signal $s_t^{\sim}$ (step S14). More specifically, a common method of converting a time series of frames into a time-domain signal by the short time Fourier transform can be used. That is, a short time inverse Fourier transform is applied to $S_n^{\sim}=[S_{n,0}^{\sim}, S_{n,1}^{\sim}, \ldots, S_{n,U-1}^{\sim}]$ for each frame n to determine a time-domain signal for each frame, and the signals for the frames are overlap-added to determine the target signal $s_t^{\sim}$. The short time inverse Fourier transform for a frame t is expressed by the formula (40a). The overlap add operation is performed by applying some time window to the time-domain signals for the frames obtained by the application of the short time inverse Fourier transform and adding the signals with the same frame shift width M as that is used by the dividing section. A specific calculation formula is expressed by the formula (40b). In this formula, $w_t^1$ represents a time window having a length of N, and floor(a) represents the maximum integer equal to or less than a.

$$x_{\tau,t} = \frac{1}{U}\sum_{u=0}^{U-1} X_{\tau,u}\exp(j2\pi ut/U) \quad (40a)$$

-continued $$x_t = \sum_{\tau=floor((t-N)/M)+1}^{floor(t/M)} w_{t-\tau M}^{l} x_{\tau,t-\tau M} \tag{40b}$$

Next, advantages of the dereverberation apparatus 300 according to the embodiment 1 will be described. The dereverberation processing from the observation signals $x_t^{(q)}$ (q=1, . . . , Q) by the dereverberation apparatus 300 can be performed as an approximate calculation for each frequency band. Since conversion into the frequency-domain signal is performed by applying the short time analysis window having a length of N while temporally shifting in steps of M samples, the length of the dereverberation filter for each frequency band can be reduced. Thus, the size of the covariance matrix required to estimate the dereverberation filter can be reduced. The reason for this is as follows. That is, in general, the size of the dereverberation filter is equal to the size of the covariance matrix used to determine the dereverberation filter. And the conversion into the frequency domain is performed by extracting N samples by temporally shifting in steps of M samples (by applying a short time analysis window having a length of N), so that the size of the dereverberation filter to be convolved decreases compared with the related art 1. Thus, the size of the covariance matrix also decreases. This can be apparently seen from the formulas (1) and (40). Comparing the size of the covariance matrix H(r) expressed by the formula (1) and the size of the covariance matrix $H'(\psi_{n,u}^2)$ expressed by the formula (40), the size of the covariance matrix H(r) according to the related art 1 depends on the prediction filter length (the length of the room impulse response) K, whereas the covariance matrix $H'(\psi_{n,u}^2)$ used in this embodiment 1 depends on $K_R$ (that is, <K/M>). This is because the number of elements (number of taps) of $B_{n-D,u}^{(q)}$ forming the covariance matrix $H'(\psi_{n,u}^2)$ is $K_R$−D, as shown by the formula (35). It will thus be understood that the size of the covariance matrix used in this embodiment 1 can be reduced compared with the related art 1. The estimation of the dereverberation filter involves not only calculation of the covariance matrix but also calculation of the inverse matrix thereof, and the calculation cost of these calculations accounts for most of the calculation cost of the entire dereverberation processing. The calculation cost of these calculations can be reduced by reducing the size of the covariance matrix. Thus, according to this embodiment, the calculation cost of the entire dereverberation processing can be significantly reduced.

Embodiment 2

In the embodiment 1, the observation signal is convolved with the dereverberation filter estimated for each frequency band to achieve dereverberation. However, as is known, dereverberation carried out by estimating the reverberation signal and determining a difference signal that is the difference between the energy of the observation signal and the energy of the reverberation signal is less susceptible to the estimation error of the dereverberation filter than the dereverberation method according to the embodiment 1. For example, such a method is described in K. Kinoshita, T. Nakatani, and M. Miyoshi, "Spectral subtraction steered by multi-step forward linear prediction for single channel speech dereverberation," Proc. ICASSP-2006, vol. I, pp. 817-820, May, 2006. An embodiment 2 is based on this concept.

Figure 5:
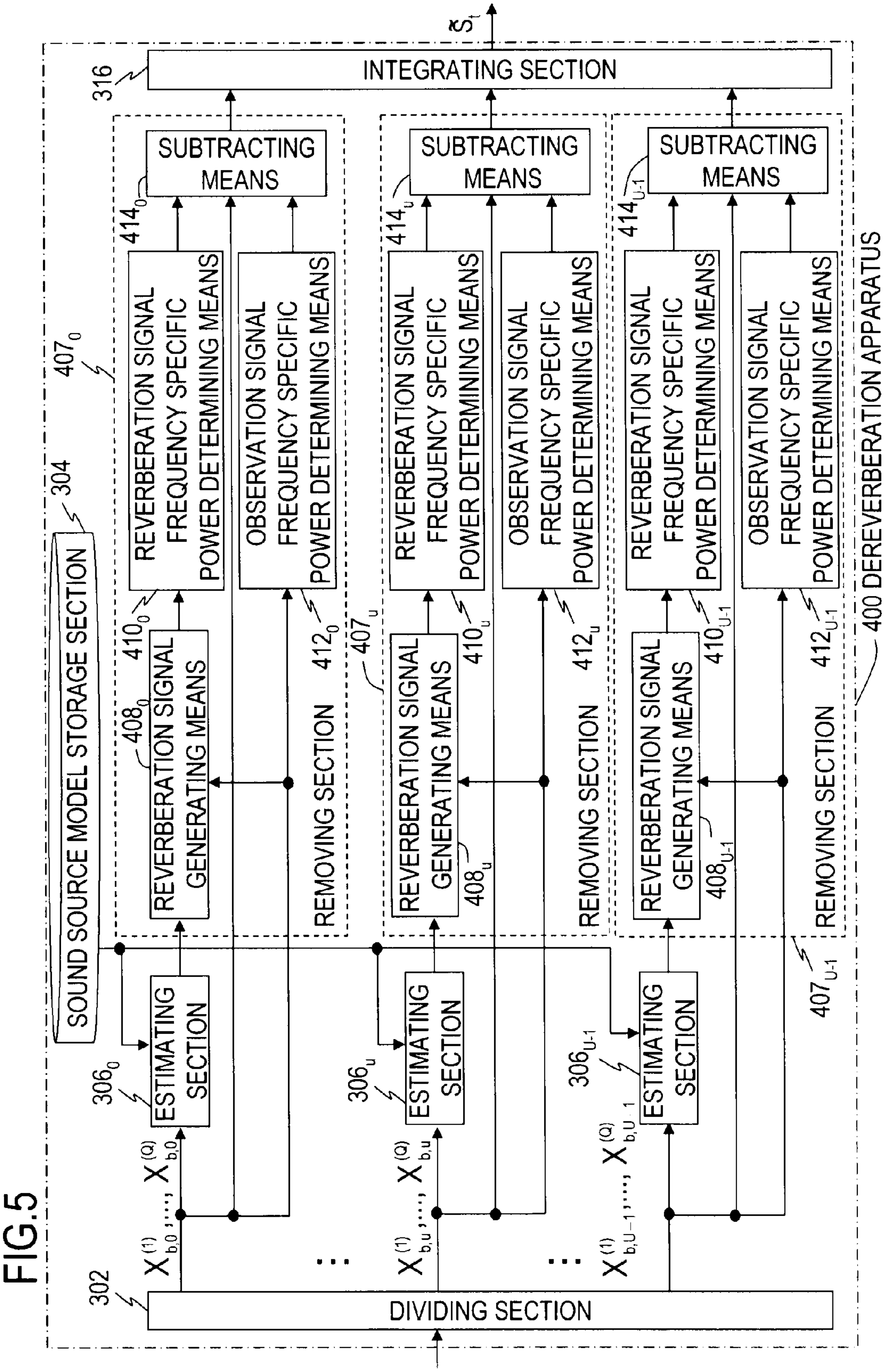
FIG. 5 is a block diagram showing an exemplary functional configuration of a dereverberation apparatus according to an embodiment 2.
Figure 6:
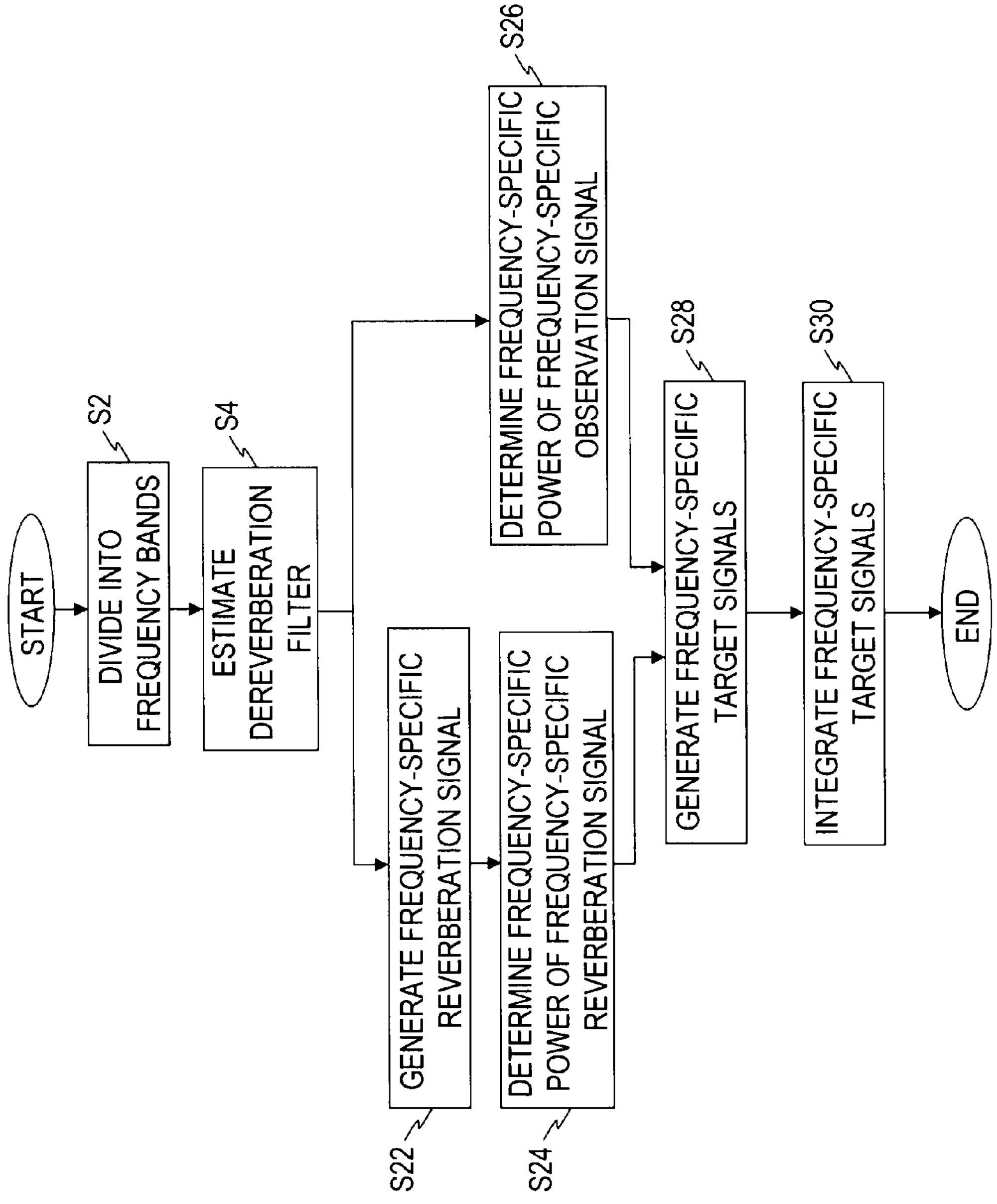
FIG. 6 is a flow chart generally showing a process performed by the dereverberation apparatus according to the embodiment 2.

A dereverberation apparatus 400 according to the embodiment 2 will be described. FIG. 5 shows an exemplary functional configuration of the dereverberation apparatus 400, and FIG. 6 shows a general flow of a processing performed by the dereverberation apparatus 400. The dereverberation apparatus 400 differs from the dereverberation apparatus 300 in that the dereverberation apparatus 400 has a removing section 407$_u$ instead of the removing section 308$_u$. The removing section 407$_u$ comprises reverberation signal generating means 408$_u$ for each the frequency band, reverberation signal frequency specific power determining means 410$_u$ for each frequency band, observation signal frequency specific power determining means 412$_u$ for each frequency band, and subtracting means 414$_u$ for each frequency band.

The dividing section 302 divides the observation signal into frequency bands (step S2), and the estimating section 306$_u$ estimates the dereverberation filter for the frequency band (step S4). Then, the reverberation signal generating means 408$_u$ generates a frequency-specific reverberation signal $R_{n,u}$ by using a dereverberation filter and a frequency-specific observation signal $X_{n,u}^{(q)}$ (step S22). More specifically, the frequency-specific reverberation signal $R_{n,u}$ is determined according to the following formula (41).

$$R_{n,u} = \sum_{q=1}^{Q} \sum_{\tau=D}^{K_R} \mathrm{diag}(X_{n-\tau,u}^{(q)}) C_{\tau,u}^{(q)} \tag{41}$$

The reverberation signal frequency specific power determining means 410$_u$ determines a frequency-specific power $|R_{n,u}|^2$ of the frequency-specific reverberation signal $R_{n,u}$ (step S24). Besides, the observation signal frequency specific power determining means 412$_u$ determines a frequency-specific power $|X^{(1)}_{n,u}|^2$ of the frequency-specific observation signal collected by the microphone for the first channel, for example (step S26). Then, the subtracting means 414$_u$ determines a difference signal $|X^{(1)}_{n,u}|^2-R_{n,u}|^2$ by calculating the difference between the frequency-specific power of the frequency-specific reverberation signal and the frequency-specific power of the frequency-specific observation signal and determines a frequency-specific target signal on the basis of the difference signal and the frequency-specific observation signal $X^{(1)}_{n,u}$ used for calculation of the difference signal (step S28). For example, the frequency-specific target signals $S_{n,u}^{\sim}$ are determined according to the following formulas.

$$S_{n,u}^{\sim} = G_{n,u} X_{n,u}^{(1)}$$

$$G_{n,u} = \max\left\{ \frac{|X_{n,u}^{(1)}|^2 - |R_{n,u}|^2}{|X_{n,u}^{(1)}|^2}, G_0 \right\}$$

In the formula, max {A, B} represents a function that chooses a larger one of A and B, and $G_0$ represents a flooring coefficient that determines the lower limit of suppression of the signal energy in power subtraction and is greater than 0 ($G_0$>0). Then, the integrating section 416 converts the frequency-specific target signals into the time domain to determine the target signal $s_t^{\sim}$ (step S30).

Even if the dereverberation filter has an estimation error, the dereverberation apparatus 400 can achieve dereverberation with less sound quality deterioration than the dereverberation apparatus 300 according to the embodiment 1.

According to the related art, the dereverberation processing can be achieved only in the time domain. However, the dereverberation apparatuses 300 and 400 according to the embodiments 1 and 2 can operate in the frequency domain and thus can be combined with other various useful sound enhancing techniques that operate in the frequency domain, such as the blind source separation and Wiener filter.

Embodiment 3

Figure 7:
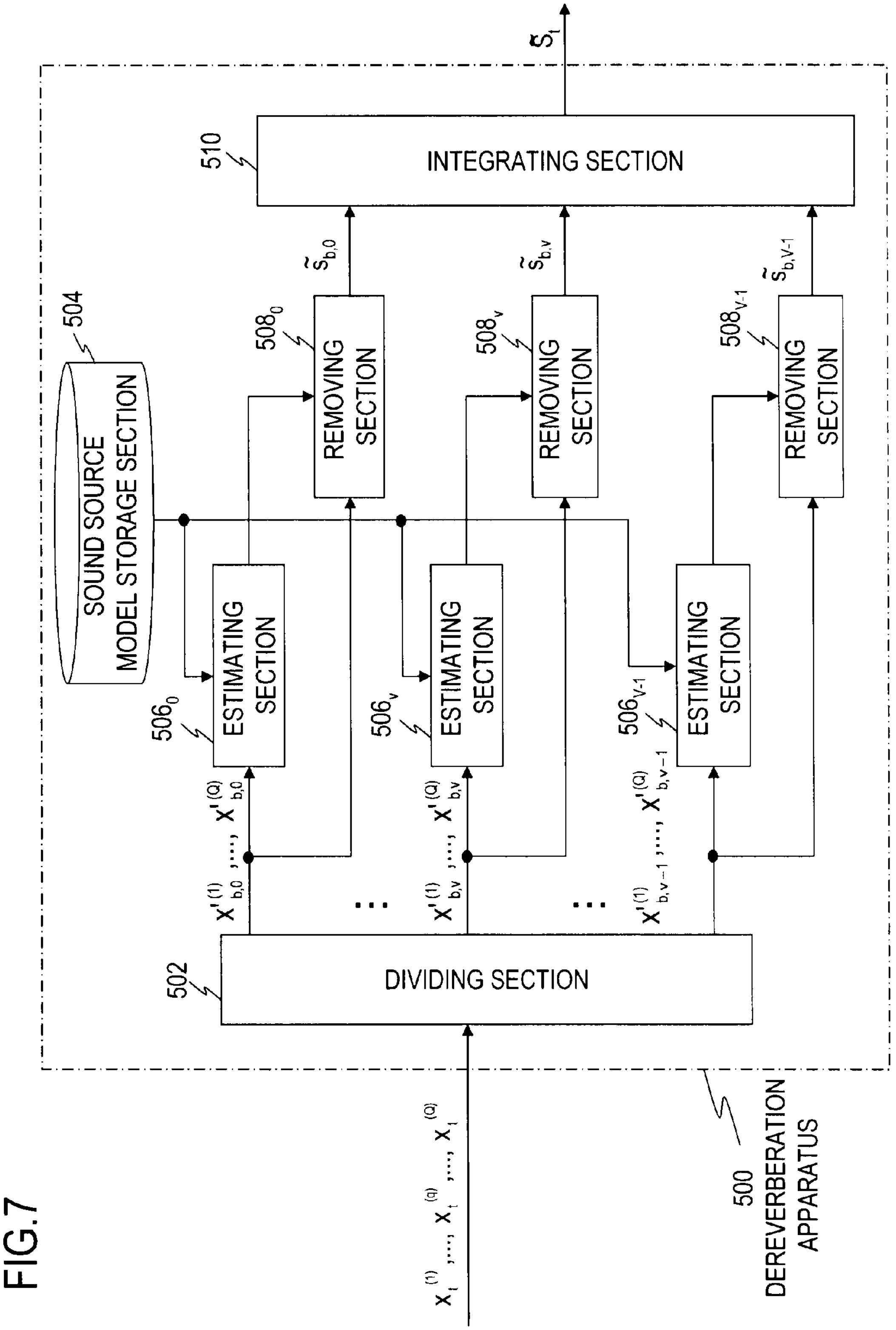
FIG. 7 is a block diagram showing an exemplary functional configuration of a dereverberation apparatus according to an embodiment 3.

FIG. 7 shows an exemplary functional configuration of a dereverberation apparatus 500 according to an embodiment 3. The dereverberation apparatus 500 differs from the dereverberation apparatus 300 primarily in that (1) a dividing section 502 of the dereverberation apparatus 500 divides the time-domain observation signal into frequency bands by using subband division, whereas the dividing section 302 of the dereverberation apparatus 300 divides the time-domain observation signal into frequency bands by using conversion into the frequency-domain signal using temporal shifting, and (2) a removing section and an integrating section of the dereverberation apparatus 500 according to this embodiment performs their respective processings in the time domain, whereas the removing section and the integrating section of the dereverberation apparatus 300 perform their respective processings in the frequency domain.

A signal resulting from the subband division is referred to as a subband signal, the number of subbands is represented by V, and a subband index is represented by v (v=0, . . . , V−1). An estimating section $\mathbf{506}_v$ estimates a dereverberation filter for each subband signal, and a removing section $\mathbf{508}_v$ removes a reverberation from each subband signal. An integrating section 510 integrates the resulting signals to determine a target signal $s_1^{\sim}$. The subband division processing by the dividing section 502 and the integration processing by the integrating section 510 are described in M. R. Portnoff, "Implementation of the digital phase vocoder using the fast Fourier transform", IEEE Trans. ASSP, vol. 24, No. 3, pp. 243-248, 1976 (referred to as Non-patent literature A, hereinafter), and J. P, Reilly, M. Wilbur, M. Seibert, and N. Ahmadvand, "The complex subband decomposition and its application to the decimation of large adaptive filtering problems", IEEE Trans. Signal Processing, vol. 50, no. 11, pp. 2730-2743, November 2002, for example. In the following description, the technique according to Non-patent literature A will be used. The formula (50) described later in this specification is described in Non-patent literature A. The general flow of the processing is the same as shown in FIG. 4, and thus descriptions thereof will be omitted.

First, a relationship between the audio signal and the observation signal will be described. The dividing section 502 divides the observation signal into V frequency bands (subbands) by performing subband division on the observation signal. According to the definition described in Non-patent literature A, the division can be expressed by the following formula (50).

$$x_{t,v}^{(q)} = \sum_{\tau=-N_h}^{N_h} x_t^{(q)} h_{t-\tau} e^{-j2\pi v\tau/V} \qquad (50)$$

In this formula, t represents a sample index of a signal obtained by applying frequency shift and a low-pass filter to the observation signal in each subband (t is the same as the discrete time of the observation signal yet to be subjected to the subband processing), and a t-th sample in a v-th subband (v=0, . . . , V−1) of the observation signal collected by a microphone for the q-th channel is denoted by $x_{t,v}^{(q)}$. And $e^{-j2\pi v\tau/V}$ represents a frequency shift operator corresponding to the v-th subband, and $h_t$ represents a coefficient of a low-pass filter having a length of $2N_h+1$. Applying the formula (50) to the both sides of the formula (12') results in the following formula.

$$x_{t,v}^{(t)} = \sum_{q=1}^{Q} \sum_{\tau=d}^{K} c_\tau^{(q)} x_{t-\tau,v}^{(q)} + \tilde{s}_{t,v} \qquad (51)$$

The term $s_{t,v}^{\sim}$ in the right side of the formula (51) represents a signal derived from the audio signal including an initial reflected sound by application of the subband division processing. In this embodiment, the signal $s_{t,v}^{\sim}$ is handled as a target signal to be determined. The dividing section 502 performs down-sampling of each subband signal in addition to the subband division. For example, b represents a sample index of a signal derived from the time series of the observation signal $x_{t,v}^{(1)}$ collected by the microphone for the first channel and the audio signal $s_{t,v}$ by down-sampling at intervals of γ samples (thinning out of samples), and the subband signal obtained as a result of the down-sampling is denoted by $x_{b,v}^{r(q)}$ or $s_{b,v}^{\sim t}$. $t_b$ represents a sample index of a signal yet to be subjected to the down-sampling that corresponds to the sample index b of the signal subjected to the down-sampling. Then, the following formula (52) results.

$$x_{b,v}^{\prime(1)} = \sum_{q=1}^{Q} \sum_{\tau=d}^{K} c_\tau^{(q)} x_{t_b-\tau,v}^{(q)} + \tilde{s}'_{b,v} \qquad (52)$$

On the other hand, $h_\tau$ relates to the low-pass filter, and thus, the signal yet to be subjected to the down-sampling can be precisely recovered by up-sampling in the case where the down-sampling is performed at a sampling frequency equal to or higher than twice the cut-off frequency of the low-pass filter. The up-sampling is performed in the following procedure, for example.

Step 1. Insert γ−1 0s between samples of the down-sampled signal.

Step 2. Apply the low-pass filter.

In step 2, a finite length impulse response filter is commonly used. This means that a signal recovered by up-sampling can be expressed by linear coupling of down-sampled signals.

Using this relationship, the expression $x_{tb-\tau,v}^{(q)}$ in the right side of the formula (52) can be transformed into the following formula (53).

$$x_{t_b-\tau,v}^{(q)} = \sum_{k=-k_0}^{k_1} \beta_{\tau,k} x_{n-k,v}^{\prime(q)} \text{ where } 0 \le \tau < \gamma \qquad (53)$$

$\beta_{\tau,k}$ represents a coefficient depending on the coefficient of the low-pass filter used for up-sampling, $k_0$ represents a delay of filtering by the low-pass filter used for up-sampling, and $k_0+k_1+1$ corresponds to a filter length of the low-pass filter used for up-sampling. Substituting the formula (53) into the formula (52) and rearranging the resulting formula results in the following formula (54).

$$x'^{(1)}_{b,v} = \sum_{q=1}^{Q}\sum_{k=d'}^{K'} \alpha^{(q)}_{k,v} x'^{(q)}_{b-k,v} + \tilde{s}'_{b,v} \quad (54)$$

In this formula, $\alpha_{k,v}^{(q)}$ represents a coefficient of the term $x'_{b-k,v}{}^{(q)}$ of the formula resulting from substituting the formula (53) into the formula (52) and rearranging the resulting formula. d' represents a delay of filtering for $\alpha_{k,v}^{(q)}$, and K' represents a filter length of filtering for $\alpha_{k,v}^{(q)}$. On the basis of the formulas (52) and (53) and the sampling interval γ, relationships $d' \approx d/\gamma - k_0$ and $K' \approx K/\gamma + k_1$ can be defined. When $d' \geqq 1$, the formula (54) represents a relationship that a residual signal of the prediction of the current observation signal from a previous observation signal using $\alpha_{k,v}^{(q)}$ as a prediction coefficient (a coefficient of a dereverberation filter estimated by the estimating section 506$_v$) for each subband signal is the audio signal including the initial reflected sound. In the following description, the formula (54) is handled as a formula that represents a relationship between the observation signal and the audio signal for each subband signal.

Formulas (55) to (58) are defined as follows.

$$\alpha_v = [\alpha_v^{(1)} \ldots \alpha_v^{(q)} \ldots \alpha_v^{(Q)}] \quad (55)$$

$$\alpha_v^{(q)} = [\alpha_{d',v}^{(q)}, \alpha_{d'+1,v}^{(q)} \ldots \alpha_{K',v}^{(q)}] \quad (56)$$

$$F_{b-d',v}[F_{b-d',v}^{(1)} \ldots F_{b-d',v}^{(q)} \ldots F_{b-d',v}^{(Q)}] \quad (57)$$

$$F_{d-d',v}^{(q)} = [x_{b-d',v}'^{(q)}, x_{b-d'-1,v}'^{(q)}, \ldots x_{b-K',v}'^{(q)}] \quad (58)$$

In this case, the formula (54) can be transformed into the following formula (59).

$$\tilde{s}_{b,v}' = x_{b,v}'^{(1)} - F_{b-d',v} \cdot \alpha_V^T \quad (59)$$

In this embodiment 3, $\alpha_v$ represents a dereverberation filter for a v-th subband signal, and the removing section 508$_v$ removes a reverberation signal according to the formula (59). Assuming that $0_{d'-1}$ represents a (d'−1)-dimensional row vector all the elements of which are 0, a dereverberation filter $w_v$ can also be expressed by the following formula (60).

$$w_v = [1 0_{d'-1} \alpha_v^{(1)} \ldots 0 0_{d'-1} \alpha_v^{(q)} \ldots 0 0_{d'-1} \alpha_v^{(Q)}] \quad (60)$$

In this case, the removing section 508$_v$ removes the reverberation signal according to the following formula (61).

$$\tilde{s}_{b,v}' = \xi_{b,v} w_v^T$$

$$\xi_{b,v} = [\xi_{b,v}^{(1)} \ldots \xi_{b,v}^{(q)} \ldots \xi_{b,v}^{(Q)}]$$

$$\xi_{b,v}^{(q)} [x_{b,v}^{(q)} x_{b-1,v}^{(q)} \ldots x_{b-K',v}^{(q)}] \quad (61)$$

Next, a method of estimating a dereverberation filter performed by the estimating section 506$_v$ will be described. The sound source model stored in a sound source model storage section 504 in this embodiment represents the possible tendency of the audio signal in the form of a probability distribution as in the embodiments 1 and 2, and the optimization function is based on the probability distribution. A useful example of the sound source model is a time-varying normal distribution. In the following description, as the simplest sound source model, a model in which signals in each subband are independent of the signals in the other subbands is introduced. In addition, it is assumed that each subband signal is a time-varying white normal process that has a flat frequency spectrum and temporally varies only in signal energy.

As with the formulas (31) and (32) described earlier, a parametric space is defined and modified as follows. Note that a probability density function of a signal $s_b^{\sim\prime} = [s_{b,0}^{\sim\prime}, \ldots, s_{b,V-1}^{\sim\prime}]^1$ is defined as follows.

$$p(s_b^{\sim\prime}) = N(s_b^{\sim\prime}; 0, \Psi_b') \quad (31')$$

$$\Psi_b' \in \Omega_{\Psi}' \quad (32')$$

In this formula, $N(s_b^{\sim\prime}, 0, \Psi_b')$ represents a multidimensional complex normal distribution with an average being 0 and a covariance matrix of the sound source model being $\Psi_b' = E(s_b^{\sim\prime}(s_b^{\sim\prime})^{*T})$, and $\Psi_b'$ assumes a different or common value for each sample b. In the following description, $\Psi_b'$ is referred to as a model covariance matrix, and it is assumed that the model covariance matrix $\Psi_b'$ is a diagonal matrix that has a different value for each sample. $\Omega_\Psi'$ represents a set of all the possible values of $\Psi_b'$ (in other words, a parametric space of $\Psi_b'$). $\psi_{b,v}'^2 = E(s_{b,v}^{\sim\prime}(s_{b,v}^{\sim\prime})^*)$ represents a v-th diagonal element of $\Psi_b'$. Since $\Psi_b'$ is a diagonal matrix, the probability density function can be defined as $p(s_{b,v}^{\sim\prime}) = N(s_{b,v}^{\sim\prime}; 0, \psi_{b,v}'^2)$ independently for each subband. $\psi_v'^2$ represents a time series of v-th diagonal elements of the model covariance matrix, and $\psi_v'^2 = \{\psi_{b,v}'^2\}$. In addition, $\theta_v = \{\alpha_v, \psi_v'^2\}$ represents a set of estimation parameters for the subband v. In addition, a set of all the estimation parameters for all the subbands is represented by $\theta' = \{\theta_0, \theta_1, \ldots, \theta_{V-1}\}$. A log likelihood function $L_v(\theta_v)$ as the optimization function for each subband and a log likelihood function $L'(\theta')$ as the optimization function for all the subbands are defined as follows.

$$L_v(\theta_v) = \sum_b \log p(x'^{(1)}_{b,v} \mid F_{b-d',v}; \theta_v) \quad (63)$$

$$L'(\theta') = \sum_v L_v(\theta_v) \quad (35')$$

The formula (63) can be transformed into the following formula (64) on the basis of the formulas (59) and (31').

$$L_v(\theta_v) = \sum_n \log N(x'^{(1)}_{b,v}; F_{b-d',v}\alpha_v^T, \phi'^2_{b,v}) \quad (64)$$

By estimating a parameter that maximizes the formula (64), an estimated value of the coefficient of the dereverberation filter can be determined. Maximization of the formula (64) can be achieved by the optimization algorithm described below.

1. Determine an initial value for all the subbands v according to the following formula (65).

$$\alpha_{b,v}^{(q)} = 0 \quad (65)$$

2. Repeat the following two formulas until convergence is achieved.

2-1. Update the model covariance matrix $\Psi_b'$ to maximize the optimization function $L'(\theta')$ with $\alpha_{b,v}^{(q)}$ being fixed for all the subbands v.

$$\hat{\Psi}_b' = \arg\max_{\Psi_b' \in \Omega_\psi'} L'(\theta') \longrightarrow \Psi_b' \quad (66)$$

2-2. Update the dereverberation filter coefficient $\alpha_v$ to maximize the optimization function $L_v(\theta_v)$ for all the subbands v with $\Psi_b'$ being fixed.

$$\hat{\alpha}_v = \left( \sum_b \frac{F^{*T}_{b-d',v} F_{b-d',v}}{\phi'^2_{b,v}} \right)^+ \sum_b \frac{F^{*T}_{b-d',v} x'^{(1)}_{b,v}}{\phi'^2_{b,v}} \rightarrow \alpha_v \quad (67)$$

The estimating section 506$_v$ constructs a dereverberation filter on the basis of $\alpha_v$ finally obtained, and the removing section 508$_v$ removes the reverberation signal using the dereverberation filter according to the formulas (59) or (61) to determine a frequency-specific target signal $s_{b,v}^{\sim\prime}$. Then, the integrating section 510 integrates the frequency-specific target signals $s_{b,v}^{\sim\prime}$ while performing up-sampling to determine the target signal $s_t^{\sim}$.

As described above, in the subband processing, since the observation signal is divided into time-domain signal for frequency bands, and then the time-domain signals are down-sampled at intervals of $\gamma$ samples, the sampling frequency of the time-domain signals for each frequency band can be reduced by $1/\gamma$.

According to this embodiment, the dereverberation processing is separately performed for the time-domain signal for each frequency band, and the resulting signals are integrated to achieve the dereverberation for all the frequency bands. Comparing the case where down-sampling of the time-domain signal is performed and the case where the down-sampling is not performed, the size of the covariance matrix used for estimating the dereverberation filter can be reduced in the case where the down-sampling is performed. This is because the size of the covariance matrix depends on the filter length of the dereverberation filter, the filter length K of the dereverberation filter depends on the number of taps of the room impulse response, and the number of taps of the impulse response decreases as the sampling frequency decreases if the temporal length of the impulse response is physically fixed. In other words, since down-sampling in steps of $\gamma$ samples is performed, the filter length of the dereverberation filter is reduced to $K'(=K/\gamma+k_1)$, which is shorter than the filter length K of the dereverberation filter according to the related art.

Since the size of the covariance matrix used to estimate the dereverberation filter decreases as the filter length of the dereverberation filter decreases as described above, the calculation cost of the estimation of the dereverberation filter is reduced.

Furthermore, in the case where the down-sampling is performed at a sampling frequency equal to or higher than twice the cut-off frequency of the low-pass filter, the subband signal determined by the subband division processing performed with the down-sampling can be precisely reconstructed by up-sampling. Therefore, the target signal is not deteriorated by the up-sampling performed when the integrating section 510 performs the integration processing.

Embodiment 4

Figure 8:
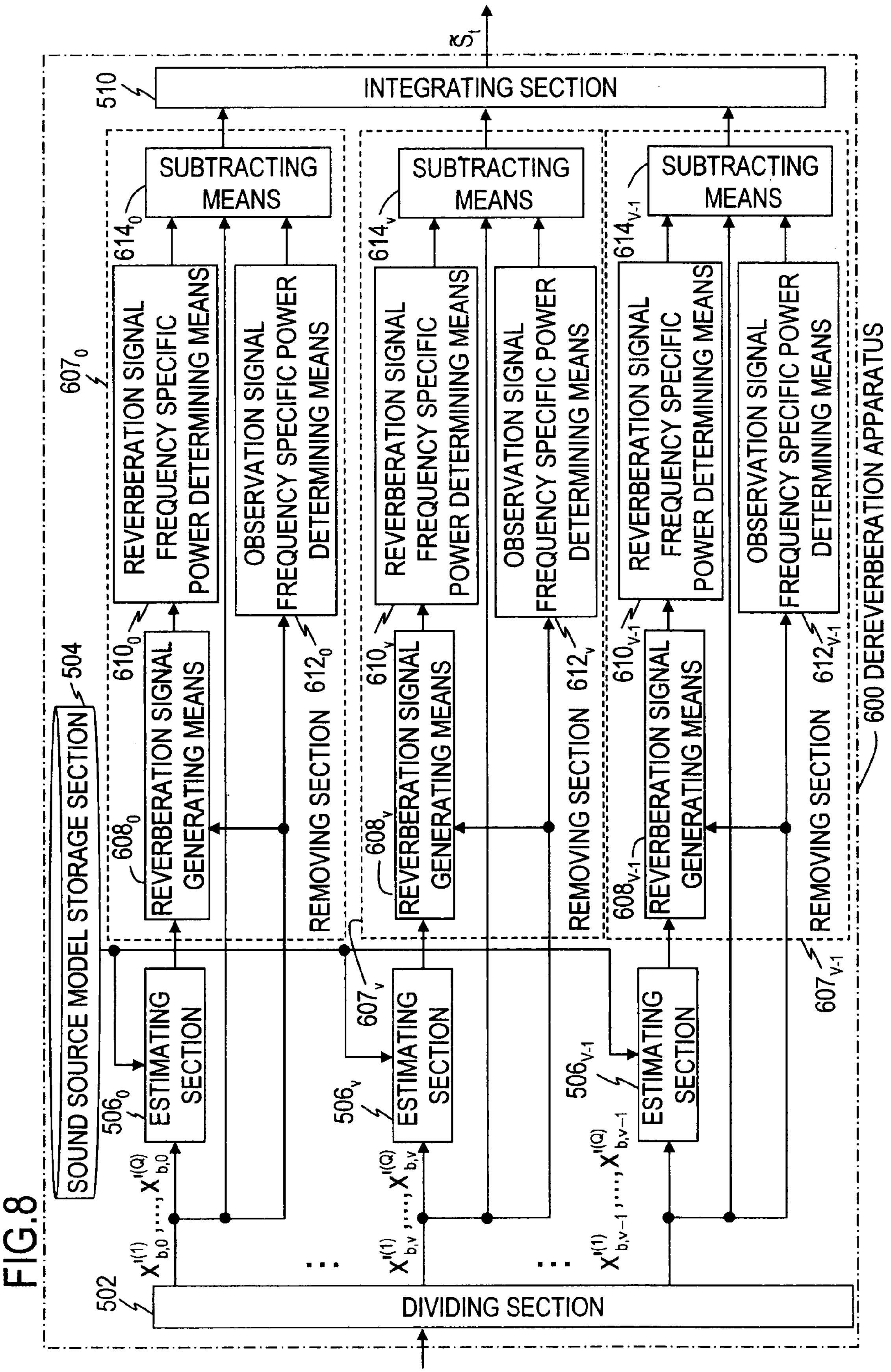
FIG. 8 is a block diagram showing an exemplary functional configuration of a dereverberation apparatus according to an embodiment 4.

FIG. 8 shows an exemplary functional configuration of a dereverberation apparatus 600 according to an embodiment 4. The dereverberation apparatus 600 differs from the dereverberation apparatus 500 in that the removing section 508$_v$ is replaced with a removing section 607$_v$. The replacement makes the dereverberation less susceptible to the estimation error of the dereverberation filter than the dereverberation apparatus 500. The reason for this is the same as described with regard to the embodiment 2. The removing section 607$_v$ corresponds to the removing section 407$_u$ described with regard to the embodiment 2. The removing section 607$_v$ comprises reverberation signal generating means 608$_v$ for each frequency band, reverberation signal frequency specific power determining means 610$_v$ for each frequency band, observation signal frequency specific power determining means 612$_v$ for each frequency band, and subtracting means 614$_v$ for each frequency band.

The reverberation signal generating means 608$_v$ determines a frequency-specific reverberation signal $r_{b,v}$ using a dereverberation filter $\alpha_v$ and an observation signal $x_{t,v}^{(q)}$. More specifically, the frequency-specific reverberation signal $r_{b,v}$ is determined according to the following formula (70).

$$r_{b,v} = F_{b-d',v} \cdot \alpha_v^T \quad (70)$$

Then, the reverberation signal frequency specific power determining means 610$_v$ determines a frequency-specific power $|r_{b,v}|^2$ of the frequency-specific reverberation signal. Besides, the observation signal frequency specific power determining means 612$_v$ determines a frequency-specific power $|x_{b,v}^{(1)}|^2$ of the observation signal $x_{b,v}^{(1)}$ collected by the microphone for the first channel. Then, the subtracting means 614$_v$ determines a difference signal $|x_{b,v}^{(1)}|^2 - |r_{b,v}|^2$ by calculating the difference between the frequency-specific power of the frequency-specific reverberation signal and the frequency-specific power of the frequency-specific observation signal and determines a frequency-specific target signal on the basis of the difference signal and the frequency-specific observation signal $x_{b,v}^{(1)}$ used for calculation of the difference signal (steps 28). For example, the frequency-specific target signals $s_{b,v}^{\sim\prime}$ are determined according to the following formulas.

$$\tilde{s}'_{b,v} = G_{b,v} x'^{(1)}_{b,v} \quad (71)$$

$$G_{b,v} = \max\left\{ \frac{|x'^{(1)}_{b,v}|^2 - |\tilde{r}_{b,v}|^2}{|x'^{(1)}_{b,v}|^2}, G_0 \right\} \quad (72)$$

In the formula, max {A, B} represents a function that chooses a larger one of A and B, and $G_0$ represents a flooring coefficient that determines the lower limit of suppression of the signal energy in power subtraction and is greater than 0 ($G_0>0$).

Then, the integrating section 510 integrates the frequency-specific target signals $s_{b,v}'^{\sim}$ ($v=0, \ldots, V-1$) and outputs the resulting target signal $s_t^{\sim}$.

The dereverberation apparatus 600 thus configured is less susceptible to the estimation error of the dereverberation filter in dereverberation signal than the dereverberation apparatus 500.

Embodiment 5

The dereverberation apparatuses 300 to 600 described above with regard to the embodiments 1 to 4 are configured for a batch processing in which all the signals are obtained in advance. However, as described with regard to an embodiment 5, reverberation signals may be sequentially removed from observation signals collected by a microphone. For example, a dereverberation filter estimated by an estimating section is configured to be (sequentially) estimated and updated at predetermined time intervals. When the update is performed, the optimization algorism described above is applied to part or all of the observation signals obtained before that point in time to estimate a dereverberation filter. In combination with the estimation, the estimating section 306$_u$ of the dereverberation apparatus 300 (see FIG. 3), the reverberation signal generating means 408$_u$ of the dereverberation apparatus 400 (see FIG. 5), the estimating section 506$_v$ of the dereverberation apparatus 500 (see FIG. 7), or the reverberation signal generating means 608$_v$ of the dereverberation apparatus 600 (see FIG. 8) applies the latest dereverberation filter at each point in time to the observation signal obtained at that point in time, thereby achieving the sequential processing. The sequential processing allows more precise dereverberation for the signal.

[Specific Example of Sound Source Model]

In the following, specific examples of the sound source model according to the embodiments 1 to 5 will be described with reference to examples of sets $\Omega_\Psi$ and $\Omega_\Psi'$. The embodiments 1, 2 and 5 will be essentially described. Descriptions of the embodiments 3 and 4 will be omitted, because specific examples thereof can be constructed by replacing the symbols in the following description of the embodiments 1, 2 and 5 as follows.

$\Omega_\Psi \rightarrow \Omega_\Psi'$ $\Psi_u \rightarrow \Psi_v'$ $\psi_{n,u} \rightarrow \psi_{b,v}'$ $X_{n,u}^{(q)} \rightarrow x_{b,v}^{(q)\prime}$ $S_{n,u}^{\sim} \rightarrow s_{b,v}^{\sim\prime}$ $B_{n,u} \rightarrow F_{b,v}$ $D \rightarrow d'$ $C_u \rightarrow \alpha_v$ $i_n \rightarrow i_b$ formula (38)→formula (66)

formula (39)→formula (67)

306$_u$→506$_v$ (1) A first specific example is a set $\Omega_\Psi$ composed of any positive definite diagonal matrix. This means that $\psi_{n,u}^2$ can assume any positive value. In this case, in the optimization algorism described above, the update formula (38) can be replaced with the following update formula (80) that is separately calculated for each of all the frequency bands. The update formula (39) is not modified.

$$\hat{\psi}_{n,u}^2=(X_{n,u}^{(1)}-B_{n-D,u}C_u^T)(X_{n,u}^{(1)}-B_{n-D,u}C_u^T)^* \tag{80}$$

(2) A second specific example will be described. As with the technique described in Non-patent literature 1, a case where the waveform of the audio signal is modeled with a finite state machine will be described. In this case, the set $\Omega_\Psi$ is composed of a finite number of positive definite diagonal matrixes. Each matrix is a covariance matrix corresponding to one of the finite number of possible states of the frequency-domain signal corresponding to the short-time signal of the observation signal. The finite number of matrixes can be constructed by clustering the frequency-domain signal of the audio signal previously collected in a non-reverberant environment or the covariance matrix thereof, for example. The finite number of the matrixes is denoted by Z, the matrix identification index is denoted by i (i=1, . . . , Z), and the covariance matrix corresponding to the state i is denoted by $\Psi(i)$.

Then, the parameter to be estimated in the iteration algorism described above is the value of the index, rather than the covariance matrix. In the following, the state at the time n is denoted by $i_n$, the covariance matrix corresponding to the state $i_n$ is denoted by $\Psi(i_n)$, and the diagonal element of the covariance matrix $\Psi(i_n)$ is denoted by $\psi_u^2(i_n)$. The state $i_n$ of the sound source model at each time is not a value specific to each frequency band but a value specific to all the frequency bands. Therefore, the optimization function determined on the basis of the log likelihood function can be defined by the following formula (81) for all the frequency bands.

$$L(\theta)=\sum_u\sum_n \log p(X_{n,u}^{(1)} \mid B_{n-D,u};\theta) \tag{81}$$

In this formula, the estimation parameter θ={C, I} is composed of a time series I={$i_1$, $i_2$ . . . } of states $i_n$ and prediction coefficients C={$C_0$, $C_1$, . . . , $C_{U-1}$} for the respective frequency bands. On the basis of the optimization function, the update formula (38) of the optimization algorism can be replaced with the following update formula (82) for all the frequency bands. The update formula (39) is not modified.

$$\hat{i}_n=\underset{i_n}{\operatorname{argmax}}\sum_u \log N(X_{n,u}^{(1)};B_{n-D,u}C_u^T,\psi_u^2(i_n)) \longrightarrow i_n \tag{82}$$

The replacement of the formula (38) with the formula (82) allows the estimating section 306$_u$ to estimate the dereverberation filter with higher precision.

(3) A third specific example will be described. By assuming that the state $i_n$ described in the example (2) is a random variable, an optimization function based on a more precise sound source model can be constructed. As an example, a case where the state $i_n$ is modeled by the first-order Markov process will be described. According to the assumption of the Markov process, $p(I)=p(i)\Pi_n p(i_n|i_{n-1})$. Parameters of the sound source model are p(i) and p(i|j) for arbitrary states i and j and a covariance matrix $\Psi(i)$ for each state. These parameters can be previously prepared along with the audio signal collected in a non-reverberant environment. The optimization function for removing the reverberation signal is as follows.

$$L(\theta)=\sum_u\sum_n \log p(X_{n,u}^{(1)} \mid B_{n-D,u};\theta)+\sum_n \log p(i_n \mid i_{n-1};\theta)+\log p(i_1;\theta) \tag{83}$$

The estimation parameter θ in the optimization function expressed by the formula (83) is the same as the estimation parameter defined by the finite state machine. The optimization function of the formula (83) can be readily maximized by simply replacing the update formula (38) in the optimization algorism described above with the following update formula.

$$\hat{I}=\underset{1}{\operatorname{argmax}}\left\{\sum_n\left(\sum_u \log N(X_{n,u}^{(1)};B_{n-D,u}C_u^T,\psi_u^2(i_n))+\log p(i_n \mid i_{n-1})\right)+\log p(i_1)\right\}\longrightarrow I \tag{84}$$

The calculation to maximize the formula (84) can be efficiently achieved by a known dynamic program.

In the description of the embodiments 1 to 5, it is assumed that, room transfer functions for different microphones have no common zero point in the formula (12') that expresses the relationship between the observation signal and the audio signal, and two or more microphones are required. However, it has experimentally confirmed that the dereverberation methods according to the embodiments 1 to 5 of the present invention can remove the reverberation with high quality even if these assumptions are not satisfied.

Figure 10A:
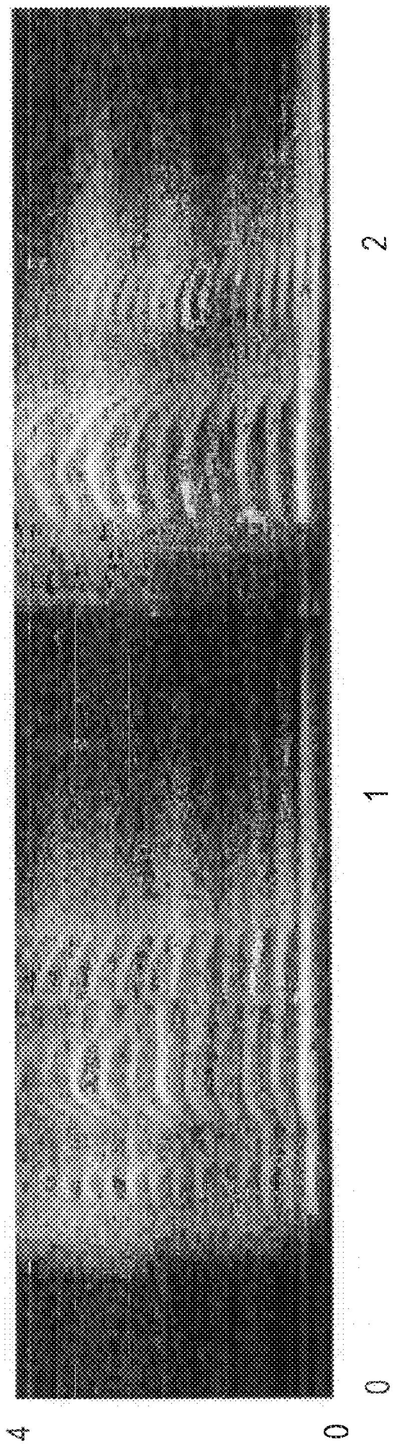
FIG. 10A is a spectrogram of an observation signal in an experiment that demonstrates the effect of dereverberation according to the embodiment 4 using a single microphone.
Figure 10B:
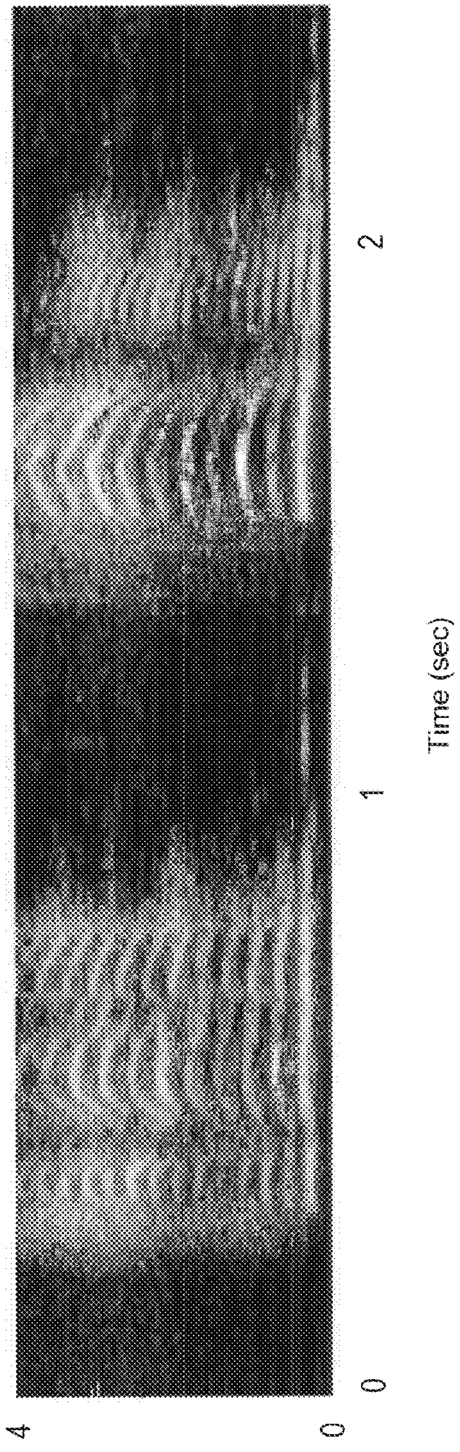
FIG. 10B is a spectrogram of a result of an experiment that demonstrates the effect of the dereverberation according to the embodiment 4 using a single microphone.

An experimental result that demonstrates that the effect of the dereverberation apparatus according to the embodiment 4 using a single microphone will be described. The subject sound is a sound signal composed of a voice sequence of five words produced by a woman. The observation signal is synthesized by convolution with a single-channel room impulse response measured in a reverberant room. The reverberation time (RT60) is 0.5 seconds. FIG. 10 includes a spectrogram of the observation signal (FIG. 10A) and a spectrogram of a signal obtained by applying this embodiment (FIG. 10B). These drawings show only the first two words. From FIG. 10, it is confirmed that the reverberation is effectively reduced.

Therefore, the present invention can be applied to a case where the number Q of microphones is one (Q=1) or a case where the room transfer functions for different microphones have a common zero point. Although it is assumed that the microphone closest to the sound source is known and is the microphone for the first channel in the related art 1, it is experimentally confirmed that the present invention does not need the assumption that the microphone closest to the sound source is known.

In the embodiments 1 to 5 described above, the processing of the dividing section involves the short-time Fourier transform and the subband division. As an alternative method of dividing into frequency bands, the wavelet transform or the discrete cosine transform may be used as far as the number of samples of the observation signal is reduced. Even if these transforms causes signals in different frequency bands to correlate with each other, the correlation can be ignored by approximation to achieve the same advantages.

Furthermore, as an alternative to calculating the formula (39) (in the case of estimating $C_u$) or the formula (67) (in the case of estimating $\alpha_v$) to optimize the dereverberation filter $C_u$ or $\alpha_v$, a sequential estimation algorithm often used in the adaptive filter may be used. As such an optimization method, the least mean square (LMS) method, the recursive least squares (RLS) method, the steepest descent method, and the conjugate gradient method are known, for example. This method can substantially reduce the amount of calculation required for one repetition. As a result, at least one estimation can be repeated in real time with a reduced calculation cost. Thus, the real time processing can be achieved with the relative inexpensive digital signal processor (DSP). Although one repetition is not always sufficient to provide a precise dereverberation filter, the estimation precision can be gradually improved with time.

<Hardware Configuration>

The dereverberation apparatuses that operate under the control of a program according to the embodiments described above have a central processing unit (CPU), an input section, an output section, an auxiliary storage device, a random access memory (RAM), a read only memory (ROM) and a bus (these components are not shown).

The CPU performs various calculations according to various loaded programs. The auxiliary storage device is a hard disk drive, a magneto-optical (MO) disc, or a semiconductor memory, for example. The RAM is a static random access memory (SRAM) or a dynamic random access memory (DRAM), for example. The bus connects the CPU, the input section, the output section, the auxiliary storage device, the RAM and the ROM to each other in such a manner that these components can communicate with each other.

<Cooperation Between Hardware and Software>

The dereverberation apparatuses according to the present invention are implemented by loading a predetermined program to the hardware described above and making the CPU execute the program. In the following, a functional configuration of each apparatus thus implemented will be described.

The input section and the output section of the dereverberation apparatus are a communication device, such as a LAN card and a modem, that operates under the control of the CPU to which a predetermined program is loaded. The dividing section, the estimating section and the processing section are a calculating section implemented by loading a predetermined program to the CPU and executing the program by the CPU. The auxiliary storage device described above serves as the sound source model storage section.

[Experimental Result]

An experimental result that demonstrates the effect of the dereverberation apparatuses according to the embodiments will be described. In this experiment, the dereverberation apparatus 300 according to the embodiment 1 and the dereverberation apparatus 100 according to the related art are compared. The subject sounds are sound signals of two voice series of five words produced by a man and a woman. The observation signal is synthesized by convolution with a two-channel room impulse response measured in a reverberant room. The reverberation time (RT60) is 0.5 seconds. The dereverberation is performed for each voice series, and the dereverberation performance is evaluated in terms of cepstrum distortion (abbreviated as CD hereinafter) of the signal after dereverberation and real time factor (abbreviated as RTF hereinafter) of the dereverberation processing. CD is defined as follows.

$$CD = (10/\ln 10)\sqrt{2\sum_{k=0}^{D}(\hat{c}_k - c_k)^2} \tag{90}$$

In this formula, $c_k\hat{}$ and $c_k$ are cepstrum coefficients of the sound signal to be evaluated and a clean sound signal, respectively, and D=12. With this evaluation measure, a signal distortion can be evaluated for both the energy time pattern and the spectral envelope. RTF is defined as (time required for dereverberation processing)/(time of observation signal). Any dereverberation method used in the experiment is implemented by the MATLAB programming language on a Linux computer. The sampling frequency is 8 kHz, and the length N of the short time analysis window is 256.

Figure 9:
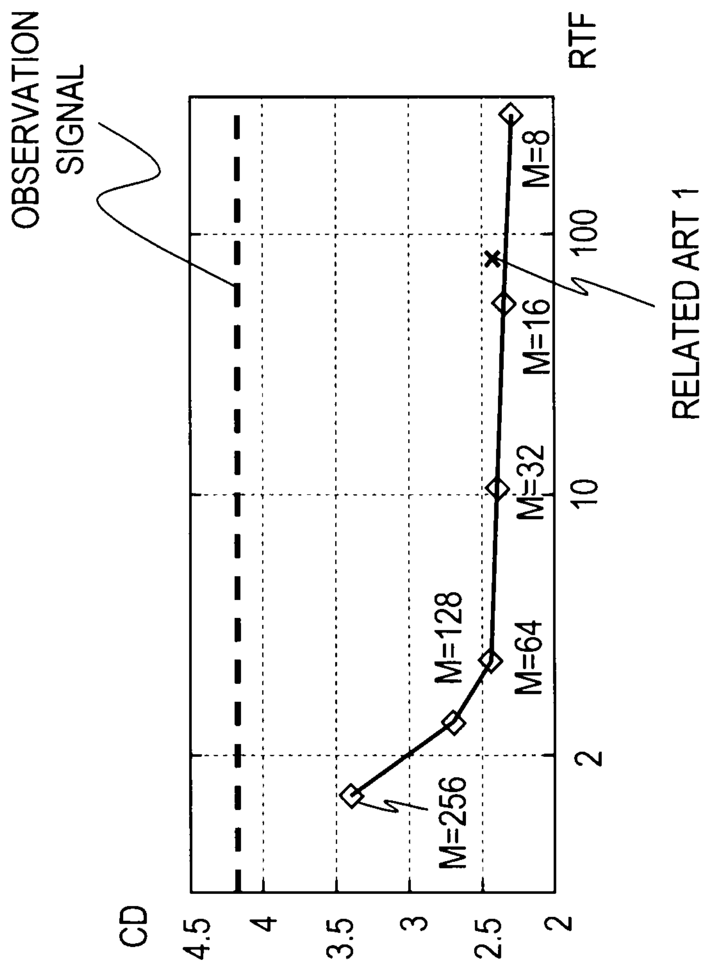
FIG. 9 is a graph showing an experimental result.

FIG. 9 is a graph showing the experimental result. The ordinate indicates CD, and the abscissa indicates RTF (in log). The solid line shows the relationship between RTF and CD of the dereverberation apparatus 300 (embodiment 1) in cases where the value of the frame shift M is 256, 128, 64, 32, 16 and 8. The "x" mark shows the dereverberation apparatus 100 (related art 1). The dashed line indicates the observation signal, and the value of CD is about 4.1.

As can be seen from FIG. 9, for the dereverberation apparatus 100, CD is about 2.4 when RTF is 90. To the contrary, for the dereverberation apparatus 300, when M=64, for example, RTF is about 2.5 whereas CD is about 2.4, which is approximately equal to the value in the related art. From this result, it can be seen that the dereverberation apparatus 300 is superior to the dereverberation apparatus 100. It can also be seen that, for the dereverberation apparatus 300, CD decreases as RTF increases.

Effects of Invention

According to the present invention, the observation signal is converted into a frequency-domain observation signal corresponding to one of a plurality of frequency bands, and a dereverberation filter corresponding to each frequency band is estimated using the frequency-specific observation signal corresponding to the frequency band. The order of the dereverberation filter corresponding to each frequency band is smaller than the order of the dereverberation filter in the case where the observation signal is used directly. Accordingly, the size of the covariance matrix decreases, so that the calculation cost involved in estimation of the dereverberation filter is reduced. In addition, since the dereverberation filter is estimated by using each frequency-specific observation signal, the room transfer function does not have to be known in advance.

What is claimed is:

1. A dereverberation apparatus that removes a reverberation signal from an observation signal by applying a dereverberation filter to the observation signal, the observation signal being obtained by collecting an audio signal emitted from a sound source, comprising:

a sound source model storage that stores a sound source model that represents the audio signal in the form of a time-varying complex normal distribution model having an average of 0 and no correlation between frequency bands;

a dividing unit that divides the observation signal into a plurality of frequency-specific observation signals each corresponding to one of a plurality of frequency bands;

an estimating unit that determines a dereverberation filter for a corresponding frequency band by using the frequency-specific observation signal for the corresponding frequency band on the basis of the sound source model and a reverberation model that represents a relationship among the audio signal, the observation signal and the dereverberation filter for the corresponding frequency band;

a removing unit that determines a frequency-specific target signal for a corresponding frequency band by applying the dereverberation filter for the corresponding frequency band determined by the estimating unit to the frequency-specific observation signal for the corresponding frequency band; and an integrating unit that integrates the frequency-specific target signals.

2. The dereverberation apparatus according to claim 1, wherein the reverberation model is an autoregressive model that represents a current observation signal in the form of a signal obtained by adding the audio signal to a signal obtained by applying the dereverberation filter to a previous observation signal having a predetermined delay.

3. The dereverberation apparatus according to claim 1 or 2, wherein the estimating unit estimates a variance of the frequency-specific target signals and estimates the dereverberation filter by using a covariance matrix of the frequency-specific observation signals normalized with the estimated variance of the frequency-specific target signals.

4. A dereverberation method that removes a reverberation signal from an observation signal by applying a dereverberation filter to the observation signal, the observation signal being obtained by collecting an audio signal emitted from a sound source, wherein a sound source model storage stores a sound source model that represents the audio signal in the form of a time-varying complex normal distribution model having an average of 0 and no correlation between frequency bands, and the dereverberation method comprises:

a dividing step of dividing the observation signal into a plurality of frequency-specific observation signals each corresponding to one of a plurality of frequency bands;

an estimating step of determining dereverberation filters each corresponding to one of the plurality of frequency bands by using the frequency-specific observation signal for the one of the plurality of frequency bands on the basis of the sound source model and a reverberation model that represents a relationship among the audio signal, the observation signal and the dereverberation filter for each of the plurality of frequency bands;

a removing step of determining frequency-specific target signals each corresponding to one of the plurality of frequency bands by applying the dereverberation filter for the one of the plurality of frequency bands determined in the estimating step to the frequency-specific observation signal for the one of the plurality of frequency bands; and an integrating step of integrating the frequency-specific target signals.

5. The dereverberation method according to claim 4, wherein the reverberation model is an autoregressive model that represents a current observation signal in the form of a signal obtained by adding the audio signal to a signal obtained by applying the dereverberation filter to a previous observation signal having a predetermined delay.

6. The dereverberation method according to claim 4 or 5, wherein the estimating step comprises a process of estimating a variance of the frequency-specific target signals, and the dereverberation filter is estimated by using a covariance matrix of the frequency-specific observation signals normalized with the estimated variance of the frequency-specific target signals.

7. A non-transitory computer-readable recording medium in which a program that makes a computer operate as the dereverberation apparatus according to claim 1 is recorded.

* * * * *